(12) United States Patent
Oyama et al.

(10) Patent No.: US 8,400,505 B2
(45) Date of Patent: Mar. 19, 2013

(54) CALIBRATION METHOD, CALIBRATION DEVICE, AND CALIBRATION SYSTEM INCLUDING THE DEVICE

(75) Inventors: Ichiro Oyama, Osaka (JP); Norihiro Imamura, Osaka (JP)

(73) Assignee: Panasonic Corporation, Osaka (JP)

( * ) Notice: Subject to any disclaimer, the term of this patent is extended or adjusted under 35 U.S.C. 154(b) by 413 days.

(21) Appl. No.: 12/668,915

(22) PCT Filed: May 19, 2009

(86) PCT No.: PCT/JP2009/002195
§ 371 (c)(1),
(2), (4) Date: Jan. 13, 2010

(87) PCT Pub. No.: WO2009/141998
PCT Pub. Date: Nov. 26, 2009

(65) Prior Publication Data
US 2010/0201809 A1 Aug. 12, 2010

(30) Foreign Application Priority Data
May 19, 2008 (JP) ................................. 2008-131327

(51) Int. Cl.
*H04N 7/18* (2006.01)
*H04N 17/00* (2006.01)
*G06K 9/40* (2006.01)

(52) U.S. Cl. ......................... 348/135; 348/188; 382/274

(58) Field of Classification Search .......................... None
See application file for complete search history.

(56) References Cited

U.S. PATENT DOCUMENTS

| 6,219,460 B1 * | 4/2001 | Tatsuta | 382/270 |
| 8,014,626 B2 * | 9/2011 | Chiba | 382/274 |
| 2004/0066454 A1 * | 4/2004 | Otani et al. | 348/188 |
| 2004/0066965 A1 | 4/2004 | Watanabe et al. | |
| 2004/0234122 A1 * | 11/2004 | Kochi et al. | 382/154 |
| 2007/0091174 A1 * | 4/2007 | Kochi et al. | 348/135 |

FOREIGN PATENT DOCUMENTS

| JP | 11-160021 | 6/1999 |
| JP | 2958458 | 10/1999 |
| JP | 2000-283753 | 10/2000 |
| JP | 2003-042730 | 2/2003 |
| JP | 2003-065714 | 3/2003 |
| JP | 2003-307466 | 10/2003 |
| JP | 2004-128887 | 4/2004 |
| JP | 2007-101276 | 4/2007 |

* cited by examiner

OTHER PUBLICATIONS

International Search Report issued Jun. 23, 2009 in International (PCT) Application No. PCT/JP2009/002195.

*Primary Examiner* — Wen-Tai Lin
(74) *Attorney, Agent, or Firm* — Wenderoth, Lind & Ponack, L.L.P.

(57) ABSTRACT

A calibration device and method calibrates a distance measuring device which provides captured images with significant lens aberration. The calibration device and method estimate a camera parameter representing a characteristic of each imaging system of a distance measuring device, and perform the following: capture, using the distance measuring device, an image of a reference chart which (i) represents a geometric pattern in which elements are arranged and (ii) is positioned to have a predetermined positional relationship with the distance measuring device; modify a luminance distribution affected by aberration of the lens in the captured image of the reference chart; calculate, as a feature point position, a gravity center position of each element in the captured image whose luminance distribution is modified; and estimate the camera parameter using the feature point position calculated in the calculating and an approximate actual gravity center position in the reference chart.

9 Claims, 14 Drawing Sheets

(a)  (b)

(a)                      (b)

Image correction parameter output (a)

(b)

(c)

(a)  (b)  (c)

(a)  (b)  (c)

CALIBRATION METHOD, CALIBRATION DEVICE, AND CALIBRATION SYSTEM INCLUDING THE DEVICE

BACKGROUND OF THE INVENTION

TECHNICAL FIELD

The present invention relates to a calibration method for use with the distance measuring device capable of calculating one of the distance to an object and the three-dimensional position or shape of the object, and relates to a calibration device and the like.

BACKGROUND ART

Recent years have seen increasing demands for distance measuring devices which measure the distance from a predetermined position to an object or the three-dimensional position of the object, and further demands for miniaturization of such measuring devices. For example, a distance measuring device constantly measures the position or shape information of a rider in a car room of an automobile, and detects a dangerous status such as taking the driver's eyes off the road ahead and falling asleep at the wheel while driving. Furthermore, techniques for supporting safety driving have been developed. Such techniques involve outputting an alert and applying the brakes of an automobile in advance depending on the detected dangerous status. In this case, the distance measuring device is set in a limited space in the car room, and thus it is desirably small.

As an exemplary small distance measuring device capable of measuring the distance to the object or the three-dimensional position or shape of the object, a compound-eye distance measuring device using compound-eye optical systems has been proposed (See Patent Literature 1).

A compound-eye distance measuring device 80 disclosed in Patent Literature 1 and the like is described with reference to FIGS. 12 and 13.

FIG. 12 is a schematic diagram of a conventional compound-eye distance measuring device 80. In addition, FIG. 13 is a schematic diagram of a general stereo distance measuring device.

As shown in FIG. 12, the conventional compound-eye distance measuring device 80 includes an imaging element 81, and an array-shaped optical system which is formed with plural single lenses 82a and 82b, and is positioned above the imaging element 81. In other words, the compound-eye distance measuring device 80 includes imaging areas 81a and 81b included in the imaging element 81, and the lenses 82a and 82b which respectively correspond to the imaging areas. Arranging plural optical systems above an imaging element in this way makes it possible to provide a very small stereo distance measuring device.

In addition, the compound-eye distance measuring device 80 can reduce the size of a lens diameter of each optical system more significantly than a general stereo distance measuring device in which an optical system is positioned above an imaging element. Reduction in lens diameter sharpens a lens curve. Accordingly, the compound-eye distance measuring device 80 makes it possible to design a small focal length, and reduce the height of the device.

As described above, the compound-eye distance measuring device 80 makes it possible to implement a stereo distance measuring device much smaller than a general stereo distance measuring device that is implemented by combining plural optical systems, shown in FIG. 13, each including imaging elements 90a and 90b, and a set of lenses (a combination of lenses) 91a and 91b positioned above the imaging elements.

It is to be noted that the stereo distance measuring device is a distance measuring device using a stereo distance measuring method which allows calculation of the distance to the object based on the disparity occurring between plural optical systems.

Next, a description is given of an exemplary calculation of the distance to the object using a stereo distance measuring method with reference to FIG. 14.

FIG. 14 is a diagram illustrating the exemplary calculation of the distance to the object according to the stereo distance measuring method in the case of using two optical systems a and b. A light beam 101a forms an image on an imaging area 104a through an optical center 105a of a lens 102a of the optical system a, and a light beam 101b forms an image on an imaging area 104b through an optical center 105b of a lens 102b of the optical system b. The optical axes 103a and 103b represent the optical axes of cameras.

Here is an exemplary case where (i) an image of the object 100 is formed at an image forming position 107a distant, by Pa, from an intersection 106a between an imaging area 104a and the optical axis 103a in the optical system a and (ii) an image of the object 100 is formed at an image forming position 107b distant, by Pb, from an intersection 106b between an imaging area 104b and the optical axis 103b in the optical system b. In this case, disparity P (=Pb−Pa) occurs between the optical system a and the optical system b.

The disparity P changes depending on a distance D between the distance measuring device and the object. The optical axis 103a of the optical system a and the optical axis 103b of the optical system b are parallel to each other. Assuming that the interval is denoted as a base line length B, and the focal lengths of the optical systems a and b are denoted as f, the distance D to the object is represented by Expression (1).

Accordingly, assuming that the base line length B and focal lengths f are already known by a previously performed calibration processing, it is possible to calculate the distance D to the object 100 by calculating the disparity P.

[Math. 1]

$$D = \frac{f \cdot B}{P} \quad (1)$$

It is to be noted that the optical axes of the optical systems a and b are not parallel in real environments in most cases. In such cases, there is a need to perform rectification processing as shown in Non-patent Literature 1, for example. As a result, an image obtainable in the case where the optical axes are parallel is generated, thereby making it possible to calculate the distance D according to the calculation of Expression (1).

Each of the imaging areas 104a and 104b are generally configured with imaging elements such as CCDs (Charge Coupled Devices) and CMOS (Complementary Metal Oxide Semiconductors). Accordingly, the disparity P is calculated using luminance signals from the object image discrete on a two-dimensional plane. In this case, the distance detection resolution R of the distance D is generally represented using Expression (2).

[Math. 2]

$$R = \frac{D^2 \cdot \text{pitch} \cdot Kp}{f \cdot B} \quad (2)$$

Here, "pitch" denotes a pixel pitch, and "Kp" denotes a sub-pixel disparity detection resolution. A sub-pixel disparity detection resolution Kp is a disparity detection resolution of a sub-pixel. More specifically, a limitation value for determining disparity with a sub-pixel accuracy such as 0.25 pixel accuracy is used as a sub-pixel disparity detection resolution Kp. It is to be noted that a sub-pixel disparity is detected according to a method proposed in Patent Literature 2, and the like.

For example, in the case where the distance D to the subject is 600 mm, the pixel pitch "Pitch" is 2 μm, the sub-pixel disparity detection resolution Kp is 0.25 pixel, the focal length f is 3 mm, and the base line length B is 2 mm, the distance detection resolution R is calculated to be 30 mm according to Expression (2).

Next, an exemplary method for detecting disparity P is described in detail. The disparity P is obtainable by calculating SADs (Sums of Absolute Differences) for an image a captured in the imaging area 104a of the optical system a and an image b captured in the imaging area 104b of the optical system b, and calculating, using the calculated correlation value, the shifts between the sub-images of each corresponding small areas in the images a and b, that are, correlation values between the small areas in each image.

It is to be noted that SAD is an example of correlation values, and other available correlation values include generally-known SSD (Sum of Squared Differences) and NCC (Normalized Cross-correlation).

The following describes the necessity of calibration according to the stereo distance measuring method. The stereo distance measuring device that performs measurement according to the stereo distance measuring method performs measurement according to so-called triangulation as shown in FIG. 14. However, in most cases, actual cameras cannot perform perspective projection that is a prerequisite for triangulation due to the influence of lens aberration represented by distortion aberration. In addition, parameters such as focal lengths in the optical systems must be known in advance of the triangulation.

Accordingly, image distortion due to the lens aberration and the parameters such as the focal lengths in the optical systems must be estimated before the distance measurement is performed. Further, the image must be corrected in order to enable disparity search calculation based on the perspective projection.

In addition, in the case where the optical axes of different optical systems in a stereo distance measuring device are not parallel to each other, huge calculation time may be required to search the disparity between images based on Epipolar Geometry Estimation. When the optical axes are not parallel, an image corrected in a way that makes parallel the optical axes between the optical systems is used in order to enable search for the disparity in a short calculation time.

As described above, in the case where distance measurement calculation is performed based on triangulation, it is very important to correct the image in order to enable disparity search calculation based on the perspective projection, estimate camera parameters, and correct the image in a way that the optical axes of the optical systems become parallel to each other. These processes are called calibration.

Next, conventional calibration is described with reference to FIGS. 15 and 16.

FIG. 15 is a diagram illustrating a calculation flow in the conventional calibration processing. In addition, FIG. 16 is a diagram showing a reference chart used in the conventional calibration.

As shown in FIGS. 15 and 16, the conventional calibration uses a reference chart 200 including elements each having a known size in a drawn pattern. The reference chart 200 is captured by a stereo camera unit 201 including plural optical systems.

Next, a feature point detection unit 202 calculates feature point coordinates showing the position of the feature point in the reference chart 200 captured by the stereo camera unit 201.

Here, the feature point shows the characteristic position of the pattern drawn in the reference chart 200, and can be set arbitrarily. For example, feature points in the reference chart 200 can be the apexes of plural tetragons drawn in the reference chart 200.

Next, a camera parameter estimation unit 203 estimates camera parameters (such as internal parameters and external parameters) of the respective optical systems, based on the feature point coordinates in the image calculated by the feature point detection unit 202 and the coordinates in the reference chart including the elements each having a known size, according to one of the numerical value calculation methods disclosed in Non-patent Literature 1 and Patent Literature 3. In other words, the camera parameter estimation unit 203 estimates, for each optical system, camera parameters such as distortion coefficients, optical centers, focal lengths, rotation of the camera coordinate systems unique to the optical systems with respect to the world coordinates, and parallel movement amounts.

Next, the rectification processing unit 204 outputs image correction parameters for converting a captured image into an image suitable for distance measurement calculation by performing paralleling processing of the cameras based on the estimated camera parameters, and the like.

The distance measuring device measures the distance to the object and the like using the camera parameters and image correction parameters obtained in this way.

The feature point detection unit 202 shown in FIG. 15 calculates plural feature point coordinates in the captured image of the reference chart 200. It is to be noted here that the accuracy of the calculated feature point coordinates places a significant influence on the estimation accuracy of the camera parameters for the respective optical systems in the calibration processing. In other words, when the calculation accuracy of the feature point coordinates is low, the camera parameter estimation unit 203 cannot estimate the camera parameters of the respective optical systems with a high accuracy.

Next, a description is given of a feature point coordinate calculation method performed by the feature point detection unit 202 using the reference chart 200 shown in FIG. 16.

FIG. 17(a) is a diagram showing the distribution of the absolute values of derivative values in the horizontal direction of the captured image of the reference chart 200. As shown in FIG. 17(a), the horizontal edges of the captured image of the reference chart 200 are extracted.

FIG. 17(b) is a diagram showing the distribution of the absolute values of derivative values in the vertical direction of the captured image of the reference chart 200. As shown in FIG. 17(b), the vertical edges of the captured image of the reference chart 200 are extracted.

FIG. 17(c) is a diagram showing a synthesized image of FIGS. 17(a) and 17(b). As shown in FIG. 17(c), the intersections of the horizontal edges and the vertical edges are extracted (examples of the intersections include the intersection 211 in FIG. 17(c)). The feature point detection unit 202 calculates the feature point coordinates assuming that the intersections of the edges obtained from the image shown in FIG. 17(c) are feature points.

Calculating the feature point coordinates with a high accuracy makes it possible to estimate the camera parameters of the respective optical systems with a high accuracy. This further makes it possible to obtain highly-accurate image correction parameters using the estimated highly-accurate camera parameters. As the result, the distance measuring device can perform highly-accurate distance measurement calculation using the obtained highly-accurate camera parameters and image correction parameters.

CITATION LIST

[Patent Literature]
[Patent Literature 1]
  Japanese Patent Publication No. 2958458
[Patent Literature 2]
  Japanese Unexamined Patent Application Publication No. 2000-283753
[Patent Literature 3]
  Japanese Unexamined Patent Application Publication No. 2003-65714
[Non Patent Literature]
[Non Patent Literature 1]
  "Three-dimensional vision", pp. 79-83, pp. 96-99, written by Go Jo and Saburo Tsuji, and published by Kyoritsu Shuppan on Sep. 25, 2002

SUMMARY OF INVENTION

As describe above, the use of the compound optical systems as shown in FIG. 12 makes it possible to reduce the size and height of the distance measuring device, and reduce the cost by reducing the number of components such as imaging elements. However, the compound optical systems as shown in FIG. 12 are smaller than the general stereo distance measuring device as shown in FIG. 13 because the lengths of the focal lengths f and base line lengths B are limited within the sizes of the imaging elements.

As the result, as shown from Expression (2), the distance measuring device using the compound optical systems as shown in FIG. 12 has a low distance detection resolution. Accordingly, in order to suppress the reduction in the distance resolution, the distance measuring device using the compound optical systems as shown in FIG. 12 is required to have a highly-accurate disparity detection resolution in the distance measurement, compared with the general stereo distance measuring device as shown in FIG. 13. For this, the distance measuring device using the compound optical systems as shown in FIG. 12 requires a sub-pixel disparity detection resolution in most cases. Accordingly, calibration-related processing by the distance measuring device using the compound optical systems shown in FIG. 12 requires sub-pixel accuracy.

However, as shown in FIG. 12, the compound-eye distance measuring device using a single lens with an aim to reduce the size, cost, and the like has a difficulty in forming an image having a high accuracy particularly in the peripheral portion because such lens is difficult to form a high-resolution image in the optical system, compared to the general stereo distance measuring device as shown in FIG. 13.

FIGS. 19(a), 19(b) and 19(c) are diagrams showing the images of the elements 210a, 210b and 210c which are being captured and the luminance distributions of the imaging elements around the centers of the respective elements in the horizontal directions (u-axis directions) in the case where the general stereo distance measuring device shown in FIG. 13 captures the reference chart in which a dot pattern is drawn as shown in FIG. 18.

In addition, FIGS. 20(a), 20(b) and 20(c) are diagrams showing the images of the elements 210a, 210b and 210c which are being captured and the luminance distributions of the imaging elements around the centers of the respective elements in the horizontal directions in the case where the general stereo distance measuring device shown in FIG. 12 captures the reference chart in which a dot pattern is drawn as shown in FIG. 18.

It is to be noted that the luminance distributions shown in FIGS. 19 and 20 are distributions of reversed luminance values.

Most of general stereo distance measuring devices are configured with optical systems each including a combination of plural lenses as shown in FIG. 13. Thus, as shown in FIG. 19, such stereo distance measuring devices can obtain a high-resolution image as a whole event though the image peripheral portion has a slight distortion due to the aberration. However, as shown in FIG. 20, the compound-eye distance measuring device shown in FIG. 12 inevitably obtains a significantly distorted or blurred image due to a significant aberration particularly in the image peripheral portion.

The degree of an image distortion changes concentrically from the position of the optical axis of a lens, which is regarded as the center, and thus the distortion is more noticeable in the radial direction (sagittal direction) and the circumference direction (tangential direction). In most cases, distortion in the circumference direction is more significant than distortion in the radial direction. Accordingly, as shown in FIG. 20(b), the image of the element 210b distorts in the horizontal direction. In addition, as shown in FIG. 20(c), the image of the element 210c distorts in the diagonal direction.

Stemming from such significant distortion or blur, the compound-eye distance measuring device in FIG. 12 suffers from an increase in the percentage of disturbance mixed in an image. Examples of disturbance include noise and variation in sensitivity and illuminance. This produces a problem that the feature point detection accuracy significantly deteriorates due to the influence of such disturbance.

As the result, the estimation accuracy for the camera parameters also deteriorates, thereby making it difficult to perform calibration processing with a sub-pixel accuracy.

It is noted that luminance gradients affected by illuminance variation of illuminations appear in the luminance distributions of the images of the respective elements of the reference chart in FIGS. 19 and 20. Such disturbance (luminance gradients) affects the captured image shown in FIG. 20 more significantly than the captured image shown in FIG. 19.

In addition, it is assumed here that the compound-eye distance measuring device shown in FIG. 12 performs calibration according to the above-described conventional calibration method. As a specific example, it is assumed that feature point coordinates are calculated by performing derivative processing on the captured image of the reference chart in FIG. 16, and camera parameters are calculated from the calculated feature point coordinates according to one of the methods disclosed in Non-Patent Literature 1 and Patent Literature 3, and the like.

In this case, a large calculation error is obtained in calculating the position of the feature point in a peripheral portion of the captured image. More specifically, assuming that the portion surrounding the optical axis position 216 is the optical axis position in the image captured by the compound-eye distance measuring device shown in FIG. 21, a large calculation error is obtained in calculating the feature point position in the image area 217 (the shaded portions).

This stems from calculation of feature point coordinates with reference to only the luminance components in the horizontal and vertical directions of the image, that is, the distortion distributions of the image in the horizontal and vertical directions, in the derivative processing shown in FIGS. 17(*a*) and 17(*b*).

As described earlier, the degree of an actual image distortion changes concentrically from the position of the optical axis of a lens, as its center, and thus the distortion is distributed in the radial direction (sagittal direction) and the circumference direction (tangential direction). In contrast, since feature point coordinates are calculated with reference to only distortion in the horizontal and vertical directions in every image according to conventional calculation of feature point coordinates, a large calculation error is obtained in the feature point coordinates in an image area 217 in which the radial and circumference directions do not match the horizontal and vertical directions of the image. In addition, a small calculation error is obtained in the feature point coordinates in the other areas, which are areas other than the image area 217, in which the radial and circumference directions approximately match the horizontal and vertical directions of the image.

Such calculation error of feature point coordinates is rarely obtained by the general stereo distance measuring device that produces only a small distortion in an image as shown in FIG. 13. However, the compound-eye distance measuring device as shown in FIG. 12 inevitably deteriorates the calculation accuracy for the feature point coordinates around the image area 217 in FIG. 21, stemming from a large degree of distortion in the image in the case of performing a conventional feature point coordinate calculation. This disables estimating camera parameters with high accuracy, which produces a problem of difficulty in performing calibration at a sub-pixel level.

As described above, the compound-eye distance measuring device shown in FIG. 12 tends to generate a blurred image due to a large degree of distortion in the image. Such blurred image is likely to lack symmetry (a concentric shape) in the distortion distribution of the image with respect to the positions of the optical axes of the lenses, stemming from the facts that the centers of the lenses are deviated or the positional relationships between the optical axes and the imaging elements are not vertical and are tilted when the lenses are mounted.

For example, in the case where an optical axis 222 of a surface at the subject side of the lens 221 does not match an optical axis 223 of a surface at the imaging element side, image distortion is distributed more dominantly in the right and left direction of FIG. 22, lacking symmetry (a concentric shape) in the distortion distribution of the image with respect to the positions of the optical axes of the lenses. In addition, blurred images tend to be more significantly affected by such variation in the distortion distribution as the degree of blurring becomes significant. Accordingly, the compound-eye distance measuring device shown in FIG. 12 is likely to produce a modeling error between a camera as an expression model and an actual camera in the calculation for estimating camera parameters disclosed in Non-Patent Literature 1, Patent Literature 3, and/or the like. In particular, the compound-eye distance measuring device shown in FIG. 12 entails a problem of having difficulty in increasing distance measuring accuracy in an image peripheral portion with a large degree of blur.

In other words, the exemplary compound-eye distance measuring device shown in FIG. 12 has a difficulty in performing highly-accurate calibration because the device cannot detect feature point positions with high accuracy due to the above-described problems which reside in calibration performed by the stereo distance measuring device that produces an image including large lens aberration according to the conventional feature point detection method. These problems are: (i) a problem that change in the luminance of an image with respect to disturbance is small stemming from the large image aberration, (ii) a problem that distortion in the radial (saggital) and circumference (tangential) directions must be considered in order to perform proper feature point detection, and (iii) a problem that it is likely to produce a modeling error between a camera as an expression model and an actual camera when the distortion distribution of the image with respect to the positions of the optical axes of the lenses lacks symmetry (concentric shape) due to errors in mounting the camera, or the like.

The present invention has been made considering these problems. The present invention has an object to provide a calibration method or the like for estimating camera parameters with a high accuracy, that is, for performing a highly-accurate calibration in calibration by a distance measuring device that produces a captured image including a large lens aberration.

In order to achieve the above-described object, the calibration method according to the present invention is intended to estimate a camera parameter representing a characteristic of each of imaging systems, of a distance measuring device, each of which includes a lens and an imaging area corresponding to the lens, and the calibration method includes: capturing, using the distance measuring device, an image of a reference chart which (i) represents a geometric pattern in which elements are arranged and (ii) is positioned to have a predetermined positional relationship with the distance measuring device; modifying a luminance distribution affected by aberration of the lens in the captured image of the reference chart captured in the capturing; calculating, as a feature point position, a gravity center position of each element in the captured image whose luminance distribution is modified in the modifying; and estimating the camera parameter using the feature point position calculated in the calculating and an approximate actual gravity center position in the reference chart.

With this, it is possible to modify a luminance distribution affected by a lens aberration before estimating feature point coordinates, which enables highly accurate calibration even when a captured image in the distance measuring device includes significant lens aberration.

Further, determining, to be a feature point, the gravity center of each element in the geometric pattern represented in the reference chart makes it possible to perform highly accurate calibration even when the luminance of feature points varies slightly in the captured image and the aberration distribution direction varies within the image surface.

In other words, determining the gravity center to be the feature point makes it possible to calculate the feature point coordinates based on the luminance value of each pixel within the captured image, thereby being able to calculate the feature point position with high accuracy even when the luminance of the feature point varies slightly in the captured image. In addition, determining the gravity center to be the feature point makes it possible to calculate feature point coordinates with consideration of the aberration in every direction in the aberration distribution without depending on the particular directions such as the horizontal and vertical directions, thereby being able to calculate the feature point positions with high accuracy even when distortion is distributed in the radial direction (saggital direction) and the circumference direction (tangential direction).

Further, the use of the feature point positions calculated with a high accuracy in this way makes it possible to estimate camera parameters with high accuracy, that is, perform highly accurate calibration.

In addition, it is preferable that the modifying includes subtracting, from a luminance value of each of the pixels, a removal value that is a value obtained by adding a predetermined offset value to a minimum luminance value within a corresponding one of calculation areas segmented for the respective elements within the captured image, and that, in the modifying, the luminance distribution affected by the aberration of the lens is modified by subtracting the removal value from the luminance value of each pixel in the subtracting. Further, it is preferable that, in the subtracting, the removal value is subtracted from the luminance value of each pixel such that the offset value is between 2.5% and 40% inclusive of a difference value between a maximum luminance value and the minimum luminance value within the calculation area.

With this, in the calibration, it is possible to suppress deterioration in the calculation accuracy of the feature point positions due to unevenness in the aberration distribution stemming particularly from the difference in the amounts of deviation between the optical axes of the lenses in the optical systems and to perform highly accurate calibration even when the captured image in the distance measuring device includes significant lens aberration.

In other words, it is possible to remove, from the captured image, a peripheral portion whose symmetry is broken and thus whose luminance value is difficult to be corrected, thereby being able to increase the accuracy in calculating the feature point positions using the gravity center. The peripheral portion is of the image of each element which constitutes the geometric pattern in the captured image.

In addition, it is preferable that the modifying further includes correcting a luminance distribution affected by (i) variation in sensitivity within the imaging area and (ii) variation in illuminance of a light source which projects light on the reference chart, and that, in the subtracting, the removal value is subtracted from the luminance value of the captured image whose luminance is corrected in the correcting. Further, it is preferable that, in the correcting, the luminance distribution affected by (i) the variation in sensitivity within the imaging area and (ii) the variation in illuminance of the light source which projects light on the reference chart is corrected using a luminance distribution in a captured image, of a illuminance distribution correction chart with a uniform color, which has been captured under approximately the same imaging condition for the reference chart.

In this way, it is possible to suppress deterioration in the accuracy of calculating the feature point positions due to disturbance such as noise, variation in the illuminance distribution and the like, thereby being able to perform highly accurate calibration even when the captured image in the distance measuring device includes significant lens aberration.

Examples of imaging conditions include setting values set in the distance measuring device, the positional relationship between the distance measuring device and the chart, and the position and illuminance of the light source which projects light on the chart. In addition, specific examples of the setting values in the distance measuring device include a shutter speed and a diaphragm.

Further, it is preferable that the geometric pattern of the reference chart is a dot pattern in which approximately circular elements are arranged, and that, in the capturing, the captured image of the reference chart is captured by the distance measuring device such that a diameter of each of the approximately circular elements corresponds to 25 pixels or more in the captured image.

This makes it possible to reduce the influence of disturbance such as noise mixed into the image, thereby being able to perform highly accurate calibration.

In addition, a calibration device estimates a camera parameter representing a characteristic of each of imaging systems of a distance measuring device using a captured image of a reference chart representing a geometric pattern, each of the imaging systems includes a lens and an imaging area corresponding to the lens, and the calibration device includes: an aberration luminance modification unit configured to modify a luminance distribution affected by aberration of the lens in the captured image; a feature point position calculation unit configured to calculate, as a feature point position, a gravity center position of each of elements in the captured image whose luminance distribution is modified in the modifying; and a camera parameter estimation calculation unit configured to estimate the camera parameter using the feature point position calculated in the calculating and an approximate actual gravity center position in the reference chart.

With this, it is possible to obtain, in the calibration device, the same advantageous effect as in the above-described calibration method.

In addition, the calibration system according to the present invention includes: a reference chart representing a geometric pattern; a distance measuring device including imaging systems each including a lens and an imaging area corresponding to the lens; and a calibration device which estimates a camera parameter representing a characteristic of each imaging system, using a captured image of the reference chart captured by the distance measuring device. The calibration device includes: an aberration luminance modification unit configured to modify a luminance distribution affected by an aberration of the lens; a feature point position calculation unit configured to calculate, as a feature point position, a gravity center position of each of elements in the captured image whose luminance distribution is modified in the modifying; and a camera parameter estimation calculation unit which estimates the camera parameter using the feature point position calculated in the calculating and an approximate actual gravity center position in the reference chart.

With this, it is possible to obtain, in the calibration system, the same advantageous effect as in the above-described calibration method.

In addition, it is preferable that the reference chart represents a dot pattern in which approximately circular elements are arranged, and that a color of each approximately circular element has a tone brighter than a tone of a background color.

With this, it is possible to reduce disturbance mixed into the captured image, thereby being able to increase the accuracy in calculating feature point positions and perform highly accurate calibration.

It is to be noted that the present invention can also be implemented as a program causing a computer to execute the steps included in the calibration method like this. Furthermore, such program can be distributed through recording media such as CD-ROMs (Compact Disc Read Only Memory) or via communication networks such as the Internet.

With the calibration method according to the present invention, it becomes possible to perform a highly-accurate calibration by properly correcting the aberration distribution and calculating feature point coordinates by performing gravity center calculation on the feature point coordinates even when the image captured by the distance measuring device includes a large aberration.

FURTHER INFORMATION ABOUT TECHNICAL BACKGROUND TO THIS APPLICATION

The disclosure of Japanese Patent Application No. 2008-131327 filed on May 19, 2008 including Description, Drawings and Claims is incorporated herein by reference in its entirety.

BRIEF DESCRIPTION OF DRAWINGS

FIG. 1 is a diagram showing a structure of a calibration system according to Embodiment 1.
FIG. 2 is a diagram showing captured images of reference charts in Embodiment 1.
FIG. 3 is a diagram showing the captured image and calculation areas of the reference chart in Embodiment 1.
FIG. 4 is a diagram showing captured images of the reference charts for illuminance distribution correction in Embodiment 1.
FIG. 7 is a graph showing experiment results as measurements of changes in the accuracy of distances measured by a compound-eye distance measuring device in the case where an offset removal amount Ko is changed in Embodiment 1.
FIG. 8 is a graph showing experiment results as measurements of changes in the accuracy of distances in the case where the diameter of each element in a dot pattern in a captured image is changed in Embodiment 1.
FIG. 9 is a diagram showing a structure of a calibration system according to Embodiment 2.
FIG. 11 is another diagram showing an embodiment according to the present invention.
FIG. 12 is a schematic diagram of a conventional compound-eye distance measuring device.
FIG. 13 is a schematic diagram of a general stereo distance measuring device.
FIG. 14 is a diagram illustrating an exemplary calculation of the distance from an object according to a stereo distance measuring method.
FIG. 15 is a diagram illustrating a calculation flow in calibration processing.
FIG. 16 is a diagram showing a reference chart used in the conventional calibration.
FIG. 18 is a diagram showing a chart for illustrating an aberration distribution.
FIG. 21 is a diagram showing areas in which camera parameters including a large estimation error are obtained according to the conventional calibration.
FIG. 22 is a diagram for illustrating deviation of the optical center of a lens.

DESCRIPTION OF THE INVENTION

A calibration method and the like according to the present invention are described targeting calibration performed by a compound-eye distance measuring device including compound-eye imaging systems each including an imaging element and an arrayed optical systems which is set above the imaging elements and formed with plural single lenses.

The compound-eye distance measuring device can reduce the size, height and cost, but suffers from a deteriorated distance detection resolution because the size is limited within the size of the imaging elements and thus the focal lengths f and base line lengths B are small. Accordingly, the distance measurement requires a sub-pixel level disparity detection resolution, and the calibration processing also requires sub-pixel level accuracy.

However, this compound-eye distance measuring device uses single lens which produces significant blur or distortion particularly in an image peripheral portion due to aberration. For this reason, the conventional calibration method does not enable highly-accurate calibration.

The present invention makes it possible to perform highly-accurate calibration by using a reference chart including a small amount of mixed-in disturbance, removing the disturbance according to a proper processing sequence, properly correcting a luminance distribution affected by aberration, and obtaining feature point coordinates by performing gravity center calculation on the feature point coordinates even when the image captured by the distance measuring device includes significant lens aberration.

Preferred Embodiments according to the present invention are described below with reference to the drawings.

[Embodiment 1]

Figure 1:
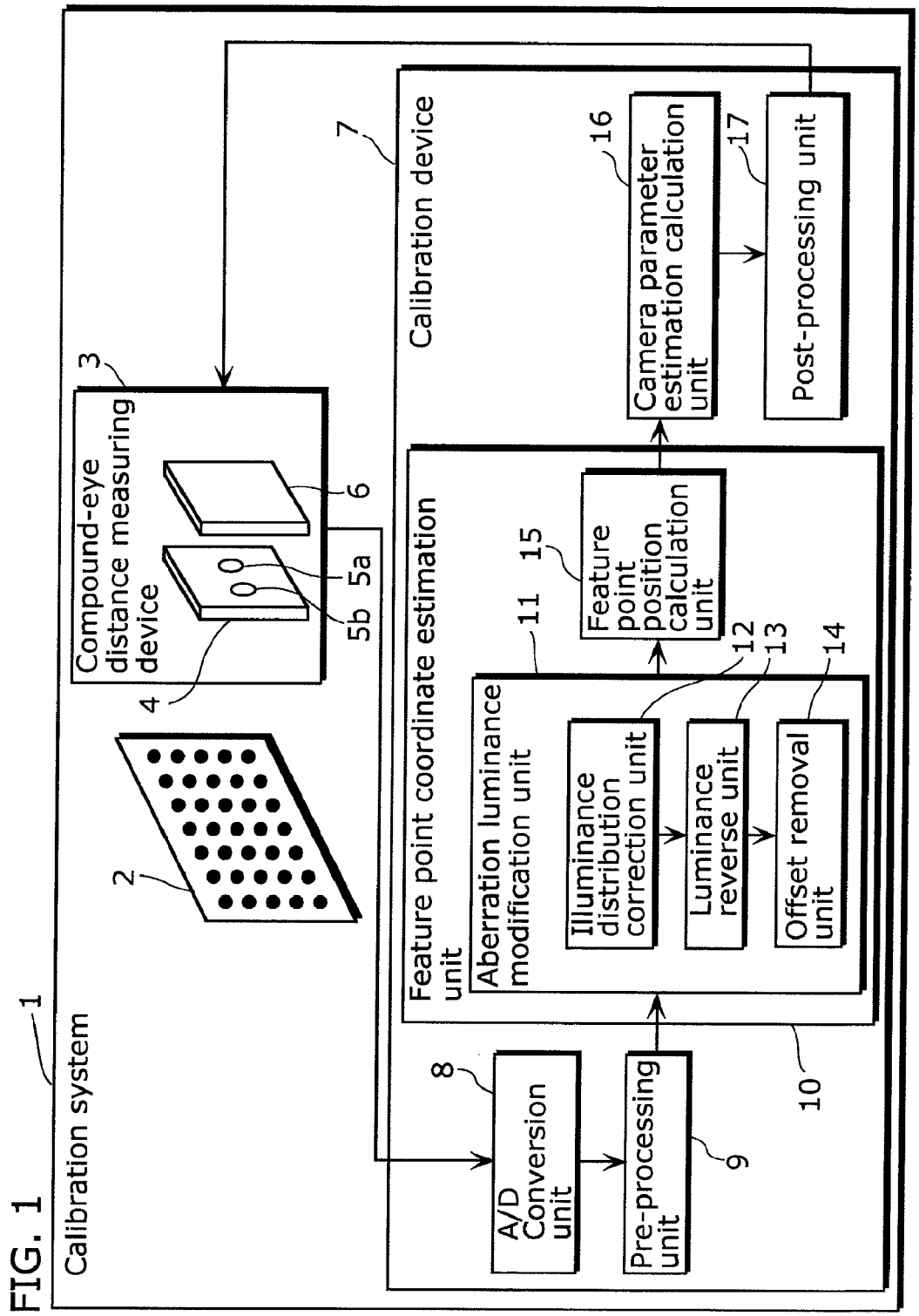
[FIG. 1]

FIG. 1 is a diagram showing a structure of a calibration system according to this Embodiment. As shown in the diagram, a calibration system 1 includes a reference chart 2, a compound-eye distance measuring device 3, and a calibration device 7. The following is a simple description given of the structural elements of the calibration system 1 and a flow of the whole processing.

The reference chart 2 is a chart of a dot pattern represented as a white background and approximately circular black elements in known sizes. Here, the dot pattern is a geometric pattern in which approximately circular elements are arranged. In addition, it is assumed that the approximately gravity center positions (or approximately center positions) of the respective elements in the reference chart 2 are actual feature point positions, and that the arranged feature point positions are already known (the elements are generated in a known size). It is to be noted that the approximately gravity center positions (or approximately center positions) cover positions that can be regarded as being included in the substantially same range in which the precise gravity center positions (or approximately center positions) are included. In addition, the reference chart 2 is positioned to be in a predetermined positional relationship with the compound-eye distance measuring device 3.

The compound-eye distance measuring device 3 is a compound-eye distance measuring device configured with two imaging systems, and more specifically, is configured with (i) a lens array 4 integrally formed with single lenses 5a and 5b, (ii) imaging elements 6, and (iii) a diaphragm, a wavelength selection filter, a light-shielding plate, a distance measurement calculation unit which are not shown. In addition, the compound-eye distance measuring device 3 transmits image information obtained by capturing an image of the reference chart 2 to the calibration device 7.

Each imaging element 6 is a solid-state imaging element such as a CMOS or CCD, and includes an imaging area corresponding to an optical system including lenses 5a and 5b.

The calibration device 7 is a device that performs calibration for the compound-eye distance measuring device 3, based on the image information transmitted from the compound-eye distance measuring device 3. The calibration device 7 includes an A/D conversion unit 8, a pre-processing unit 9, a feature point coordinate estimation unit 10, a camera parameter estimation calculation unit 16, and a post-processing unit 17.

The A/D conversion unit 8 generates an image signal 20 obtained by converting, into a digital signal, an analog signal including the image information transmitted from the compound-eye distance measuring device 3. The image signal 20 includes the whole contents of the image captured by each of the two imaging systems.

The pre-processing unit 9 extracts a captured image 21 (an area enclosed by dotted lines) of the reference chart 2 mapped on the lens 5a and a captured image 22 (an area enclosed by dotted lines) of the reference chart 2 mapped on the lens 5b, from the image signal 20 generated by the A/D conversion unit 8. Further, the pre-processing unit 9 determines calculation areas (areas enclosed by dotted lines) for calculating the position coordinates of the respective approximately circular elements.

Here, a description is given of an exemplary calculation area setting method. First, the pre-processing unit 9 generates, as a template image, an image having a dot pattern which is predicted to be obtained in the case where the reference chart 2 is captured, based on the sizes of the respective approximately circular elements drawn on the reference chart 2, the positional relationship between the compound-eye distance measuring device 3 and the reference chart 2, and approximate values of the optical constants of the compound-eye distance measuring device 3 obtained from design specifications. Next, the pre-processing unit 9 calculates the coordinates around the centers of the respective elements from the captured images 21 and 22 of the reference chart 2 by template matching. Lastly, the pre-processing unit 9 can determine calculation areas for calculating the position coordinates of the respective dots in the dot pattern as shown in the dotted lines in FIG. 3 by setting quadrate areas each of which has a predetermined size and whose center is determined to be the coordinates around the calculated center.

Figure 3:
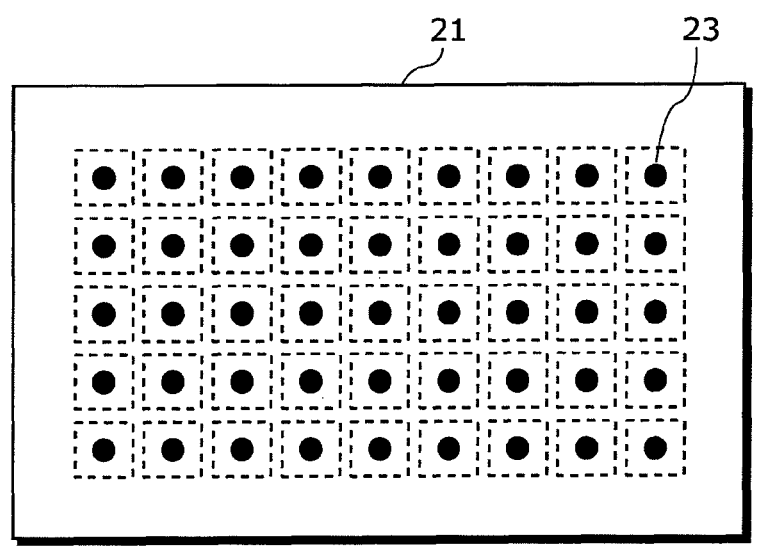
[FIG. 3]

The feature point coordinate estimation unit 10 includes an aberration luminance modification unit 11 and a feature point position calculation unit 15, and calculates the feature point coordinates of the respective elements in the dot pattern at a sub-pixel level, from the captured images 21 and 22 extracted by the pre-processing unit 9 using the respective calculation areas shown by the dotted lines in FIG. 3.

The aberration luminance modification unit 11 includes a illuminance distribution correction unit 12, a luminance reverse unit 13, and an offset removal unit 14, and corrects the luminance distribution affected by the aberration between the lenses 5a and 5b in the captured images 21 and 22 of the reference chart 2.

The illuminance distribution correction unit 12 corrects the luminance distribution affected by variation in the sensitivity in the imaging areas and variation in the luminance of the light source which projects light on the reference chart 2 in the captured images 21 and 22 extracted by the pre-processing unit 9. More specifically, the illuminance distribution correction unit 12 corrects the luminance distribution affected by variation in the sensitivity in the imaging areas and variation in the illuminance of the light source which projects light on a reference chart, using the luminance distribution in a captured image obtained by capturing the illuminance distribution correction chart having a uniform color under approximately the same image capturing condition as in the case of the reference chart 2.

The luminance reverse unit 13 reverses the luminance values of the image corrected by the illuminance distribution correction unit 12. Here, reversing a luminance value means determining, to be a new luminance value, the value obtained by subtracting the luminance value represented as a value between 0 and 255 inclusive from the maximum luminance value 255.

The offset removal unit 14 subtracts, from the luminance value of each pixel, a removal value that is a value obtained by adding a predetermined offset value to the minimum luminance value within each calculation area set to be an individual segment. This subtraction is performed for each of the elements of the image having luminance values reversed by the luminance reverse unit 13. It is preferable that the offset removal unit 14 subtracts, from the luminance value of each pixel, the removal value as an offset value equal to a value between 2.5% and 40% inclusive of the difference value between the maximum luminance value and the minimum luminance value in each calculation area.

It is to be noted that the above-mentioned aberration luminance modification unit 11 including the illuminance distribution correction unit 12, the luminance reverse unit 13, and the offset removal unit 14 is described in detail later with reference to FIGS. 4 to 6.

The feature point position calculation unit 15 calculates, based on Expression (3), the gravity center coordinates (Cu, Cv) in each calculation area in the image having aberration corrected by the aberration luminance modification unit 11. In other words, the feature point position calculation unit 15 calculates feature point coordinates that are the coordinates of the feature point positions in a captured image at a sub-pixel level, assuming, as the feature point positions, the gravity center positions of the approximately circular elements of the dot pattern.

[Math. 3]

$$Cu = \sum_i \sum_j (ui \cdot m(ui, vj)) \quad (3)$$
$$i = 1, 2, \ldots m, \; j = 1, 2, \ldots, n$$
$$Cv = \sum_i \sum_j (vj \cdot m(ui, vj))$$
$$i = 1, 2, \ldots m, \; j = 1, 2, \ldots, n$$
$$m(ui, vi) = \frac{I(ui, vi)}{\sum_i \sum_j (I(ui, vi))}$$

Here, Cu denotes the coordinate value in the horizontal direction of the gravity center coordinates in the calculation area, and Cv denotes the coordinate value in the vertical direction of the gravity center coordinates in the calculation area. In addition, the size of the calculation area corresponds to m×n pixels, and I denotes the luminance value of each set of coordinates within the calculation area. The advantageous effect obtainable by determining the gravity center of each element as the feature point position is described later.

It is to be noted that the compound-eye distance measuring device 3 captures plural images each having a different positional relationship between the compound-eye distance measuring device 3 and the reference chart 2. Further, the feature point coordinate estimation unit 10 calculates the feature point coordinates for each of the images captured by the compound-eye distance measuring device 3.

The camera parameter estimation calculation unit 16 estimates camera parameters of the two optical systems of the compound-eye distance measuring device 3, based on the feature point coordinates on the image calculated by the feature point coordinate estimation unit 10 and the known coordinates of the feature points on the Literature 1 and Patent Literature 3, and the like.

Here, specific examples of camera parameters include focal lengths, pixel pitches, distortion coefficients, image centers (the intersections of images and optical axes in the coordinates on the respective images), and the positional relationships (rotation and parallel movements) between camera coordinate systems and the world coordinate systems of known coordinates of feature points on the reference chart 2.

As a specific example, the camera parameter estimation calculation unit 16 calculates a camera intrinsic matrix A, a rotation matrix R, and a translation vector t by solving a projection equation (Expression (4)) in perspective projection, using the feature point coordinates (u, v) on the image and the world coordinates (X, Y, Z) of an actual feature point position on the reference chart 2.

[Math. 4]

$$s\tilde{m} = A[R, t]\tilde{M} \quad (4)$$
$$\tilde{m} = [u, v, 1]^T$$
$$\tilde{M} = [X, Y, Z, 1]^T$$

Here, s denotes a scalar. In addition, u and v are the coordinates of each image coordinate system, and X, Y and Z are the coordinates of each world coordinate system.

As shown in Expression (5), the camera intrinsic matrix A is a matrix including five internal parameters au, av, θ, u0 and v0, as shown in Expression (5). In addition, the rotation matrix R and the translation vector t are external parameters showing the positional relationship between the camera coordinate system and the world coordinate system.

[Math. 5]

$$A = \begin{pmatrix} \alpha_u & -\alpha_u \cot\theta & u0 \\ 0 & \alpha_v/\sin\theta & v0 \\ 0 & 0 & 1 \end{pmatrix} \quad (5)$$

Here, each of au and av is a multiple of the focal length and the pixel pitch in the u-axis direction or the v-axis direction. In addition, θ denotes an angle between the u axis and the v axis. In addition, each of u0 and v0 denotes the coordinates of the image center in the image coordinate system.

In this way, the camera parameter estimation calculation unit 16 can obtain camera parameters by calculating the camera intrinsic matrix A, the rotation matrix R, and the translation vector t by substituting the feature point coordinates on the image and the reference chart 2 into Expression (4).

It is to be noted that the above-described camera parameter estimation method is an example, and the camera parameter estimation calculation unit 16 may estimate camera parameters according to any other estimation methods for estimating camera parameters using feature point coordinates.

The post-processing unit 17 generates image correction parameters for generating coordinate systems suitable for stereo distance measurement calculation such as rectifying two optical systems, based on the camera parameters estimated by the camera parameter estimation calculation unit 16. Furthermore, the post-processing unit 17 outputs, to the compound-eye distance measuring device 3, the generated image correction parameters, and the camera parameters estimated by the camera parameter estimation calculation unit 16.

Next, an exemplary processing performed by the aberration luminance modification unit 11 is described in detail with reference to FIGS. 4 to 6. Here, the focus is placed on the processing that the aberration luminance modification unit 11 performs on an image formed by the lens 5a. It is to be noted that the processing performed on an image formed by the lens 5b is the same as the image formed by the lens 5a, and thus no description is provided.

Figure 4:
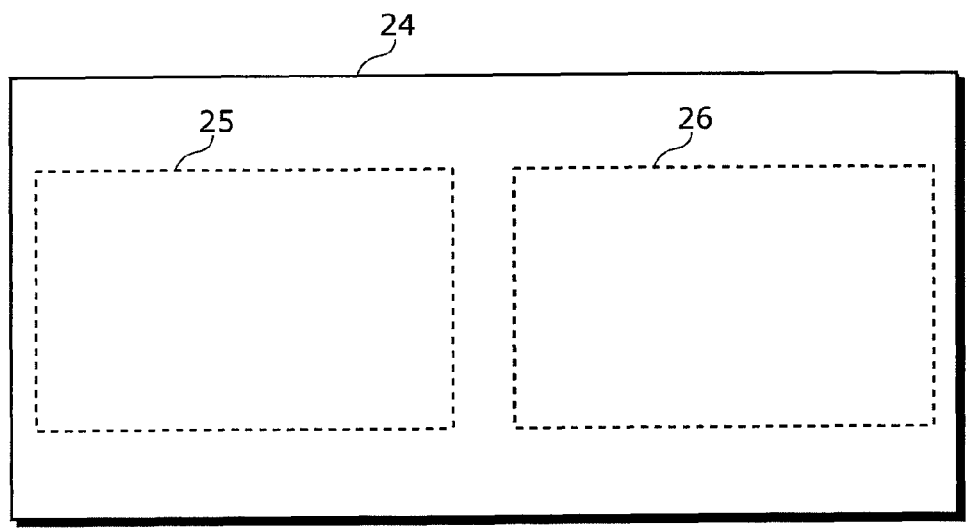
[FIG. 4]
Figure 5:
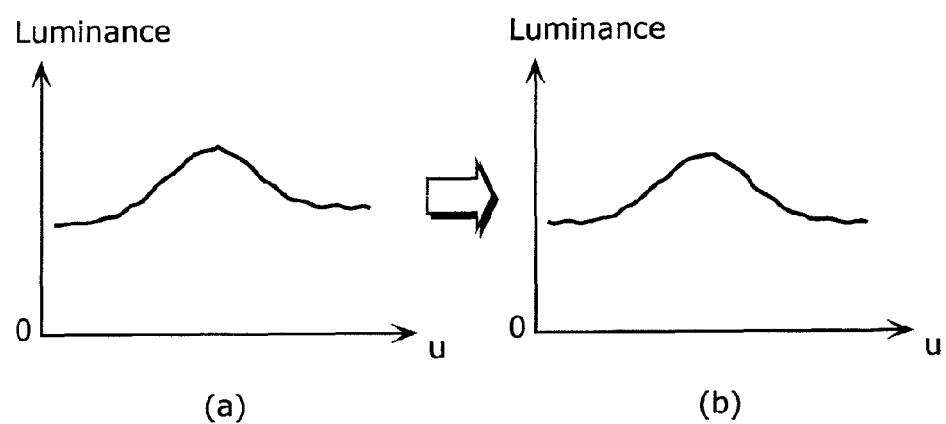
[FIG. 5]
Each of FIGS. 5(a) and 5(b) is a diagram showing a luminance distribution (horizontal direction) around the center of an element in the reference chart in Embodiment 1.

A description is given of processing performed by the illuminance distribution correction unit 12 with reference to FIGS. 4 and 5.

FIG. 4 is a diagram showing an image signal 24 of the illuminance distribution correction chart that the compound-eye distance measuring device 3 has captured in advance under approximately the same image capturing conditions as used for the reference chart 2. The illuminance distribution correction chart is a chart represented using a uniform color such as a white color without using any pattern.

The captured images 25 and 26 enclosed by the dotted lines within the image signal 24 is the images of the illuminance distribution correction chart formed by the lenses 5a and 5b, respectively.

First, the illuminance distribution correction unit 12 calculates the maximum luminance value Ismax within the captured image 25.

Next, the illuminance distribution correction unit 12 calculates, for each pixel in the captured image 25, the scaling factor Ks (u,v) (=Ismax/Is (u,v)) that is the ratio between the luminance value Is (u,v) at a current pixel position and the maximum luminance value Ismax.

Figure 2:
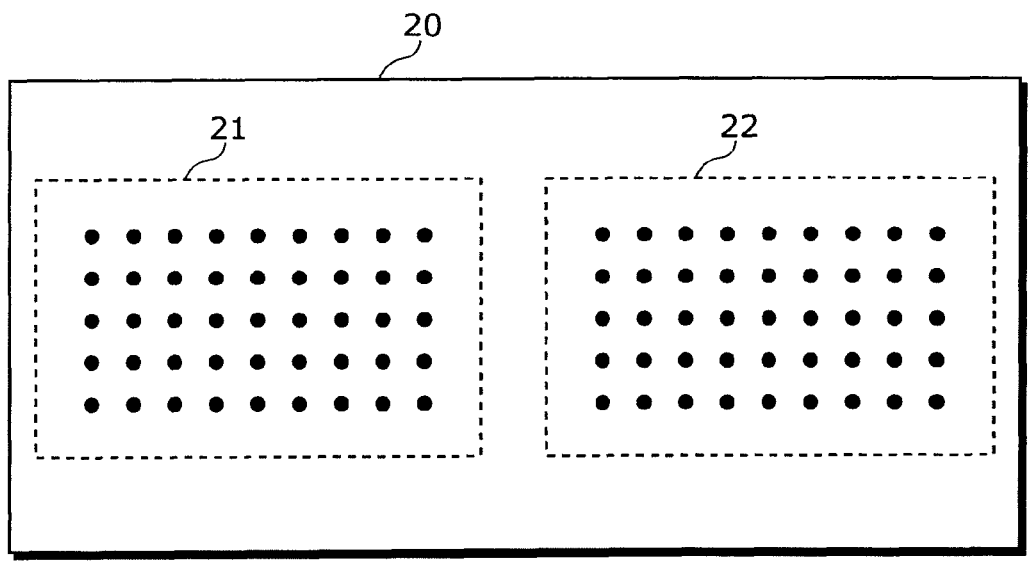
[FIG. 2]

The illuminance distribution correction chart itself has an approximately uniform color distribution (white here) in the chart surface, and thus the distribution of the scaling factors Ks represents illuminance conditions, a CCD sensitivity distribution, and a distribution of the percentages of luminance deterioration due to shading characteristics of the lenses, or the like. The illuminance distribution correction unit 12 applies the distribution of this scaling factor Ks to the captured image 21 (FIG. 2) of the reference chart outputted by the pre-processing unit 9. In other words, the illuminance distribution correction unit 12 corrects the illuminance conditions, the CCD sensitivity distribution, and the luminance deterioration due to the shading characteristics of the lenses or the like in the captured image 21 of the reference chart 2, using, as a new luminance value, the luminance value obtained by multiplexing the luminance value of each pixel of the captured image 21 and the scaling factor Ks of the pixel.

For the captured image 21 corrected in this way, the luminance reverse unit 13 outputs an image having reversed luminance values.

This embodiment describes an exemplary case where the calibration device to which the present invention is applied corrects the illuminance distribution using, as the scaling factor Ks, the ratio between each maximum luminance value in the captured image and the luminance value of the current pixel, but it is to be noted that devices to which the present invention can be applied are not limited to this calibration device. For example, such illuminance distribution may be corrected by calculating a scaling factor Ks using an arbitrary luminance value Isfix instead of Ismax.

FIG. 5 is a diagram showing the luminance distribution (horizontal direction) around the center of the element 23 of the reference chart 2 in the captured image 21 shown in FIG. 3. FIG. 5(a) shows a reversed luminance value in the luminance distribution of the captured image 21 inputted into the illuminance distribution correction unit 12, and FIG. 5(b) shows the luminance distribution of the captured image 21 outputted from the luminance reverse unit 13.

As shown in FIG. 5(a), the luminance distribution is inclined due to the influence of illuminance conditions and the like before the illuminance distribution correction unit 12 corrects the luminance distribution. In contrast, as shown in FIG. 5(b), the inclination of the luminance distribution is corrected after the illuminance distribution correction unit 12 corrects the luminance distribution.

Figure 6:
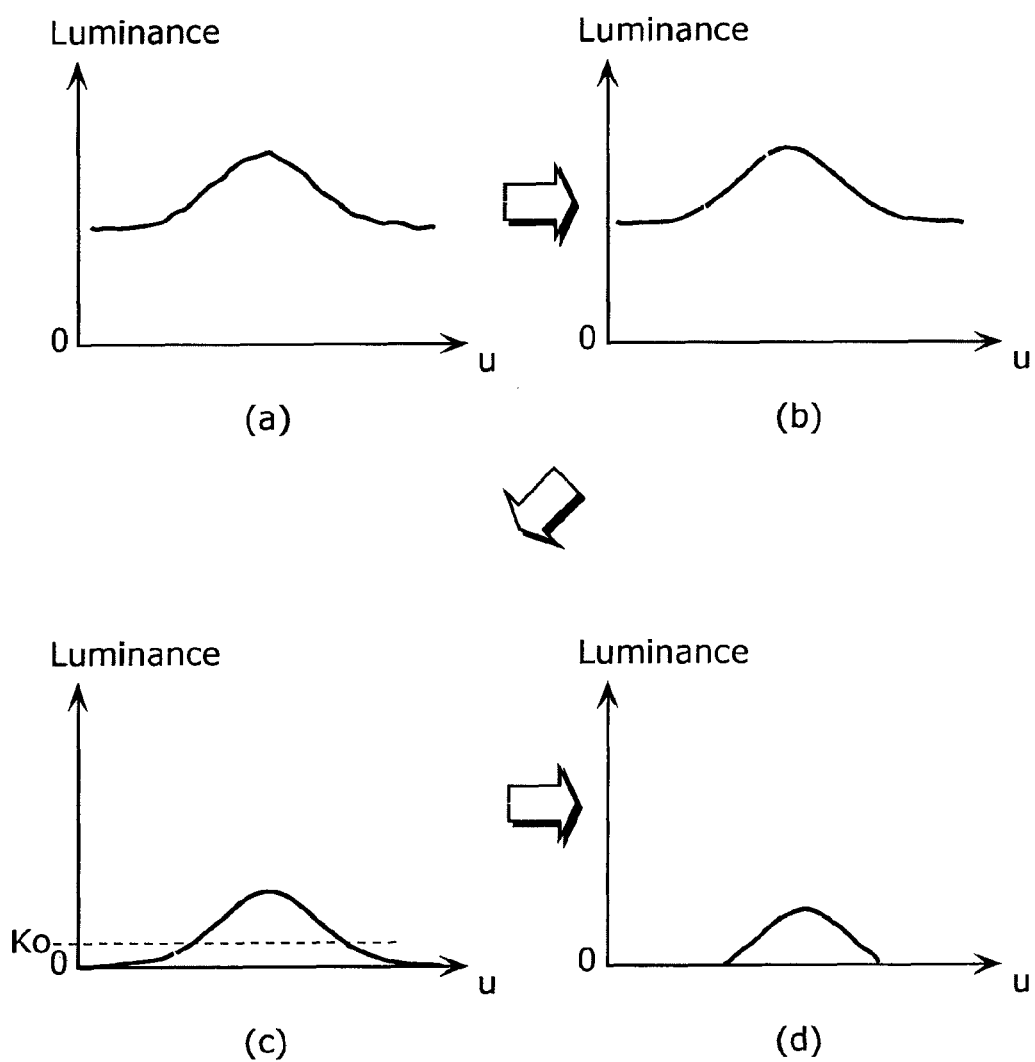
[FIG. 6]
Each of FIGS. 6(a) to 6(b) is a diagram showing a luminance distribution (horizontal direction) around the center of an element in the reference chart in Embodiment 1.

Next, a description is given of processing performed by the offset removal unit 14 with reference to FIG. 6.

FIG. 6 is a diagram for illustrating the processing performed by the offset removal unit 14, and shows a horizontal luminance distribution (in the horizontal direction) around the center of the element 23 of the reference chart 2.

More specifically, FIG. 6(a) is a diagram showing the luminance distribution of an image inputted to the offset removal unit 14. In addition, FIG. 6(b) is a diagram showing the luminance distribution of a captured image to which the offset removal unit 14 has applied a smoothing filter in a later-described first step. In addition, FIG. 6(c) is a diagram showing the luminance distribution of the captured image obtained by the processing that the offset removal unit 14 has subtracted the minimum luminance value within a calculation area from the luminance values in all the pixels within the calculation area in a later-described second step. In addition, FIG. 6(d) is a diagram showing a luminance distribution of the captured image obtained by the processing that the offset removal unit 14 has subtracted an offset removal amount Ko from the luminance values in all the pixels within the calculation area in a later-described fourth step.

The offset removal unit executes the processing in three steps. First, in the first step, the offset removal unit 14 reduces noise in the image by applying the smoothing filter (low-pass filter) to the image within each calculation area. As the result, the luminance distribution (FIG. 6(a)) of the image to be inputted to the offset removal unit 14 is a luminance distribution obtained by removal of high-frequency components as shown in FIG. 6(b).

Next, in the second step, the offset removal unit 14 subtracts the minimum luminance value Imin within each calculation area from the luminance values of all the pixels within the calculation area using the image whose noise is reduced in the first-step processing. As the result, the luminance distribution shown in FIG. 6 (b) becomes the luminance distribution from which luminance values not greater than the minimum luminance value have been removed as shown in FIG. 6 (c).

Next, in the third step, the offset removal unit 14 subtracts, for each calculation area, a predetermined offset removal amount Ko from all the luminance values within the calculation area using the image from which the minimum luminance value Imin is subtracted in the second-step processing. As the result, the luminance distribution shown in FIG. 6(c) becomes the luminance distribution from which the offset removal amount Ko has been removed as shown in FIG. 6(d).

As described above, the illuminance distribution correction unit 12, the luminance reverse unit 13, and the offset removal unit 14 execute processing sequentially, thereby enabling the aberration luminance modification unit 11 to modify the luminance distribution affected by aberration of the lens 5a.

In particular, the illuminance distribution correction unit 12 corrects illuminance conditions, CCD sensitivity distributions, and luminance deterioration due to shading characteristics of the lens before the offset removal unit 14 performs the second- and third-step processing for luminance value subtraction, which enables the offset removal unit 14 to subtract an appropriate luminance value in the second step. In other words, correcting disturbance mixed in the image in a proper sequence enables the feature point position calculation unit 15 to calculate the feature point coordinates more correctly.

In addition, the smoothing filter executes the smoothing processing (first step) before the offset removal unit 14 performs the second- and third-step processing for luminance value subtraction, which makes it possible to reduce the influence of noise in the case of determining the luminance value to be subtracted.

The offset removal unit 14 separately performs the second-step processing of subtracting the minimum luminance value Imin and the third-step processing of subtracting the predetermined offset removal amount Ko, but it is to be noted that the sum of the minimum luminance value Imin and the offset removal amount Ko may be subtracted at the same time.

Figure 7:
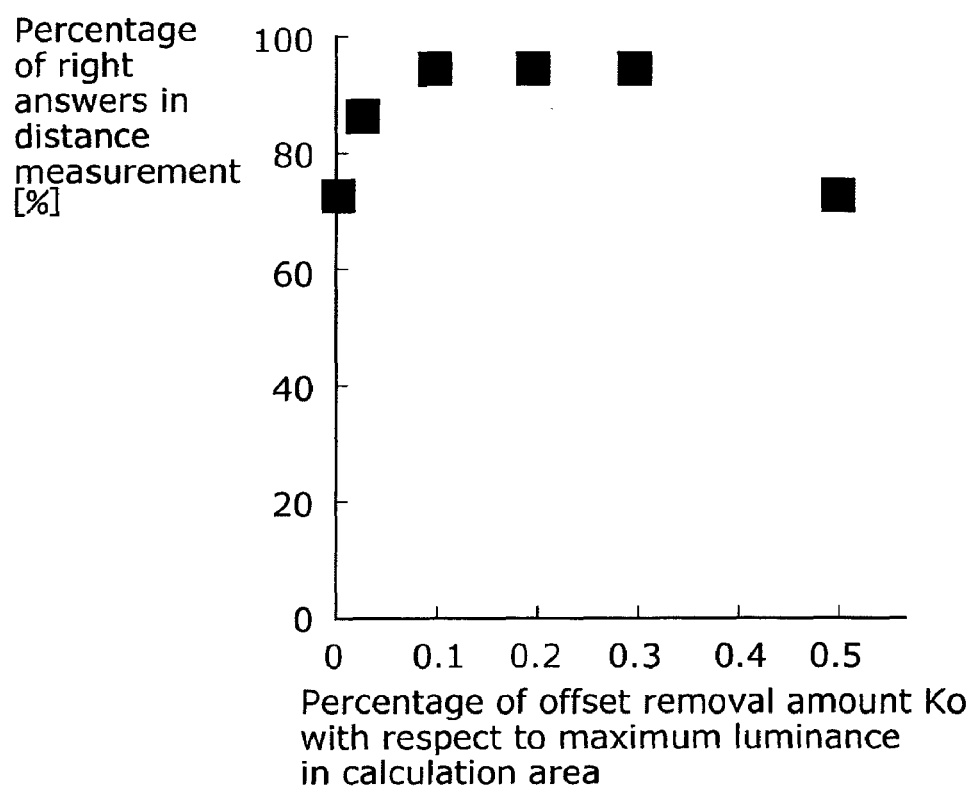
[FIG. 7]

Next, a description is given of the offset removal amount Ko that the offset removal unit 14 subtracts in the third step with reference to FIG. 7.

FIG. 7 is a graph indicating an experiment result obtained by measuring the variation in the distance measurement accuracy of the compound-eye distance measuring device 3 in the case where the offset removal amount Ko is changed.

The horizontal axis in the graph of FIG. 7 shows the percentage of the offset removal amount Ko with respect to the maximum luminance value within the calculation area, calculated by the subtraction of the minimum luminance value in the second step. In addition, the vertical axis shows a percentage of correct answers to the measurements within the image areas which the compound-eye distance measuring device 3 has measured using the predetermined distance measurement accuracy verification chart.

In this experiment, the percentage of the correct answers has been calculated assuming that a disparity detection error in the distance measurement calculation corresponds to 0.3 pixel or less. The distance measurement calculation is performed using image correction parameters that the calibration device 7 shown in FIG. 1 has calculated using the predetermined offset removal amount Ko.

As shown in FIG. 7, setting an offset removal amount Ko within a range of 50% with respect to the maximum luminance value (luminance before offset removal) in the calculation area increases the distance measurement accuracy of the compound-eye distance measuring device 3 more significantly than the distance measurement accuracy in the case where the offset removal unit 14 does not perform the third step (the percentage of the correct answers in distance measurement in the case where the horizontal axis of FIG. 7 is 0). In particular, it is expected that setting an offset removal amount Ko within a range between 2.5% to 40% of the maximum luminance value in the calculation area provides an effect of significantly increasing a distance measurement accuracy.

Accordingly, the offset removal unit 14 calculates, for each calculation area, a value corresponding to 2.5% to 40% of the maximum luminance value from which the minimum luminance value Imin has been removed in the second step, and subtracts, as the offset removal amount Ko, the calculated value from the luminance distribution.

The reason why the distance measurement accuracy is increased in this way is that it is possible to remove a portion in which the luminance distribution lacks symmetry in the peripheral portion of the image of an element 23 which constitutes a dot pattern. In other words, in the peripheral portion of the image of the element 23, the symmetry (concentric shape) with respect to the lens optical axis position of the luminance distribution is broken due to the influence of the aberration of the lens in the image mainly because the axis of the lens is deviated, and the optical axis of the lens and the imaging surface of the imaging element are mounted not vertically. As the result, it is difficult to make a model of the peripheral portion of the image of the element 23, and to correct the luminance value. Thus, removing the portion in which luminance value correction is difficult due to the asymmetry from the target for feature point coordinate calculation.

The distance measurement result of FIG. 7 is a distance measurement calculation result obtained in the case of an image captured using a lens whose axis deviation amount is approximately 3 µm. As the result that the unbalance portion in the distribution distorted due to the lens axis deviation has been removed in the third-step processing performed by the offset removal unit 14, the distance measurement accuracy has been increased.

Next, a description is given of an advantageous effect obtainable by determining a feature point position to be the gravity center of each element 23.

As described earlier, the compound-eye distance measuring device 3 shown in FIG. 1 includes more significant lens aberration in a captured image than a general stereo distance measuring device does. As the result, the luminance distribution in the captured image changes concentrically from the lens optical axis position as its center. In other words, distortion is distributed in the radial direction (saggital direction) and the circumference direction (tangential direction).

Accordingly, feature point coordinates must be estimated according to a method with consideration of such distortion in the case where the luminance values in the feature points vary slightly because of significant aberration. For example, in the case where the outer shape of each element 23 is calculated using a general digitalization processing, and the center position of the calculated outer shape is determined to be the feature point coordinates, the value calculated to be the feature point coordinates significantly varies depending on a threshold value used in the digitalization. Accordingly, in the case where the luminance values of the feature points vary slightly due to significant aberration, it is not proper to use the method for calculating the feature point coordinates based on the digitalization processing.

Figure 17:
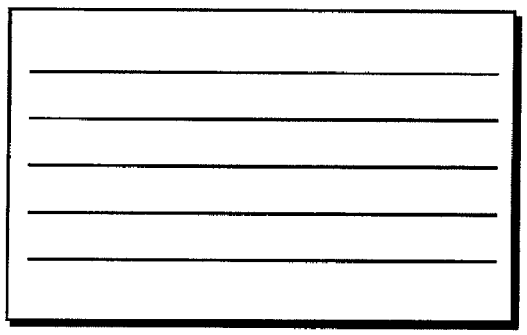
[FIG. 17]
Each of FIGS. 17(a) to 17(c) is a diagram for illustrating a feature point coordinate calculation method in the conventional calibration.
Figure 17:
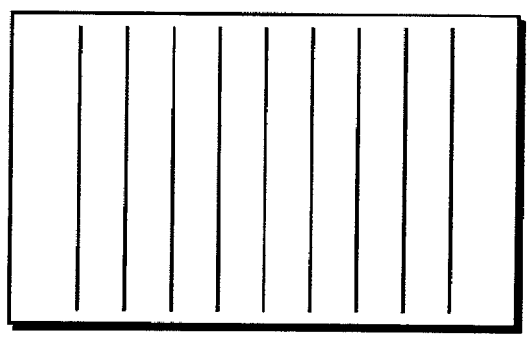
Figure 17:
Figure 17:
Figure 17:
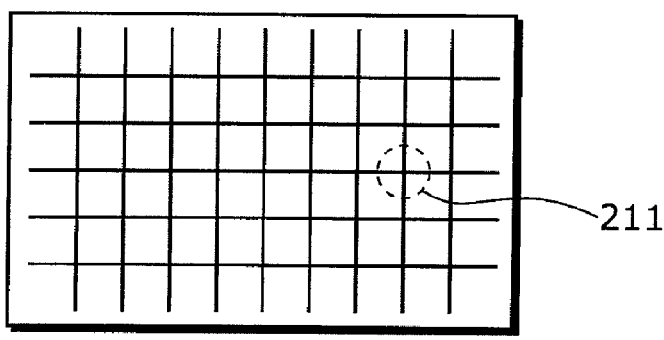
Figure 18:
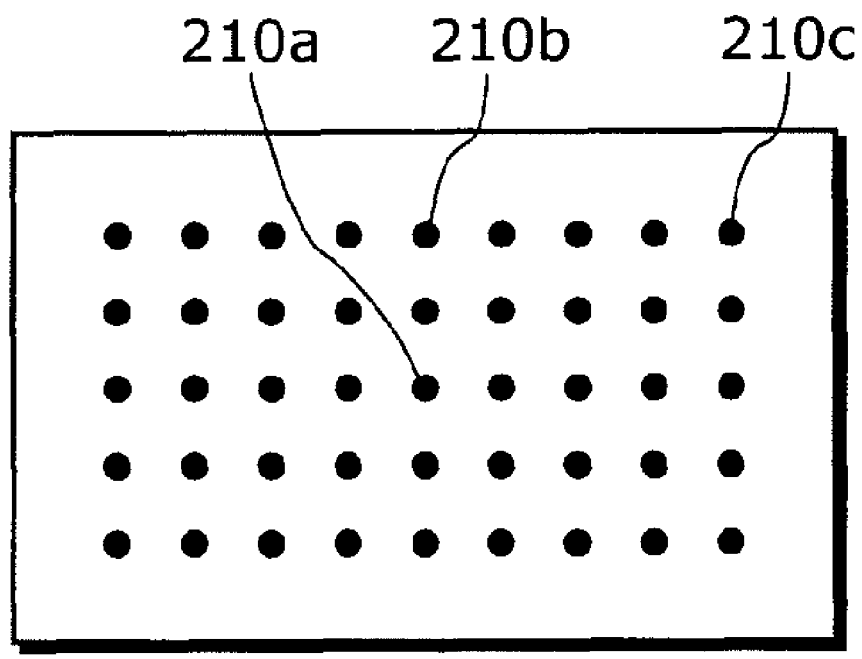
[FIG. 18]
Figure 19:
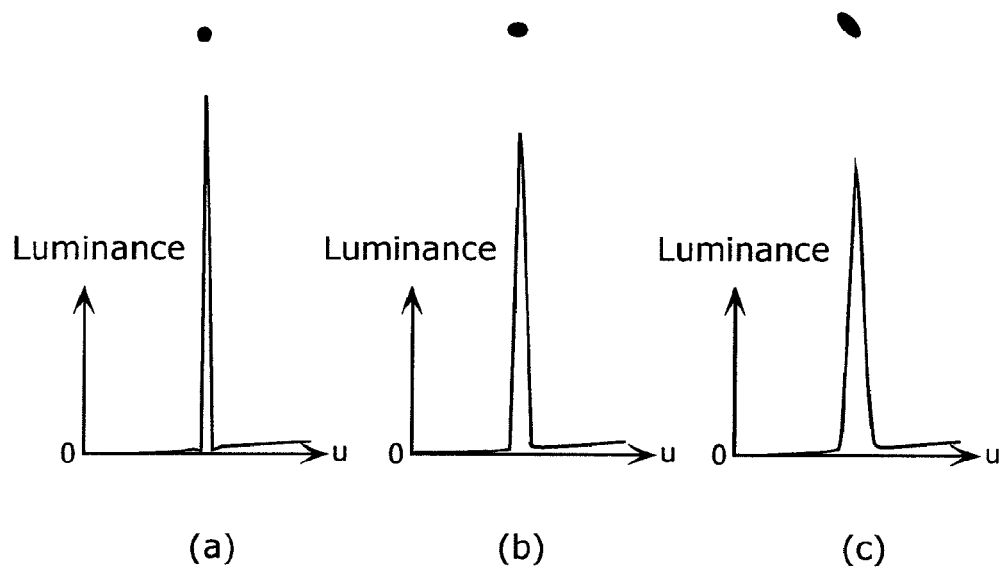
[FIG. 19]
Each of FIGS. 19(a) to 19(c) is a diagram showing a luminance distribution of an image captured by a general stereo distance measuring device.
Figure 20:
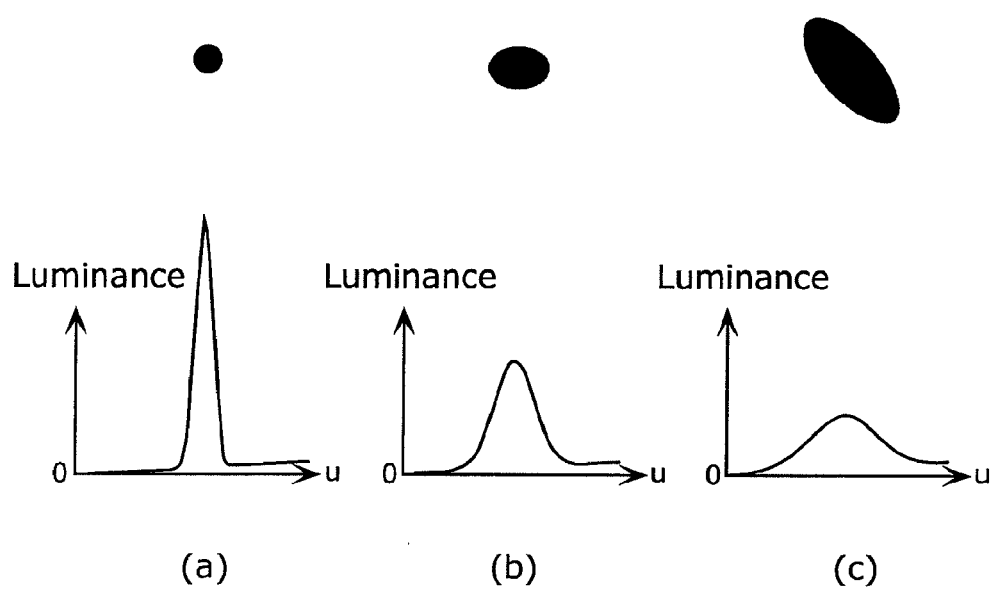
[FIG. 20]
Each of FIGS. 20(a) to 20(c) is a diagram showing a luminance distribution of an image captured by a stereo distance measuring device using compound-eye optical systems.
Figure 21:
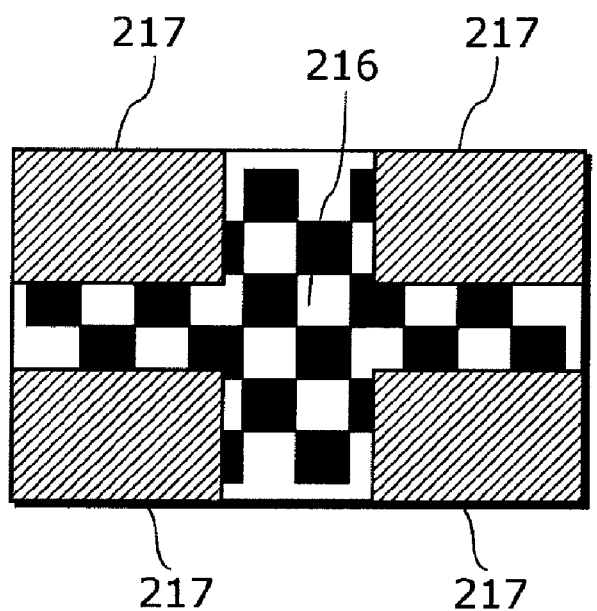
[FIG. 21]
Figure 22:
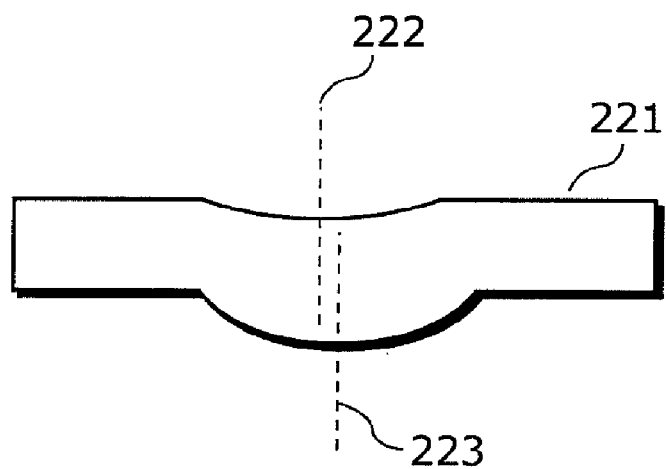
[FIG. 22]

Further, the feature point coordinates must be estimated according to a calculation method with consideration of aberration in every direction in the aberration distribution. In other words, it is not proper to use a calculation method with consideration of only the aberration in the horizontal and vertical directions in the aberration distribution like the calculation of feature point coordinates using edges shown in FIG. 17.

For this, the feature point position calculation unit 15 calculates feature point coordinates using gravity center calculation shown in Expression (3). With this, the feature point position calculation unit 15 can calculate the feature point coordinates based on the luminance value of each pixel in the captured image, and thus it can calculate the feature point coordinates with a high accuracy even when the luminance values of the feature points in the captured image vary slightly. In addition, the feature point position calculation unit 15 can calculate the feature point coordinates with consideration of the aberration in every direction in the aberration distribution without depending on specific directions such as the horizontal and vertical directions. Therefore, the feature point position calculation unit 15 can calculate the feature point coordinates with a high accuracy even when the distribution includes distortion in the radial direction (saggital direction) and the circumference direction (tangential direction).

The camera parameter estimation calculation unit 16 estimates camera parameters using the feature point coordinates calculated with a high accuracy according to the gravity center calculation, thereby significantly reducing the camera parameter estimation error that is produced in the case of using any conventional calibration method.

As described above, the calibration system according to the present invention removes disturbance in an appropriate sequence even when an image captured by a compound-eye distance measuring device includes significant lens aberration, corrects the aberration distribution properly, and calculates feature point coordinates using gravity center calculation. Thereby, the calibration system reduces (i) deterioration in the feature point detection accuracy due to the disturbance such as noise and variation in the illuminance distribution of an illumination or the like and (ii) the bad influence of unbalance aberration distribution affected by lens axis deviation. With this, the calibration system can perform highly accurate calibration.

It is desirable that the positional relationships between the diameter of each element 23, the compound-eye distance measuring device 3, and the reference chart 2 are determined such that the diameter of each element 23 in the dot pattern drawn in the reference chart 2 in FIG. 1 corresponds to 25 pixels or more in the image captured by the compound-eye distance measuring device 3. With this, the calibration system 1 can further reduce the influence of disturbance such as noise mixed in the image.

Figure 8:
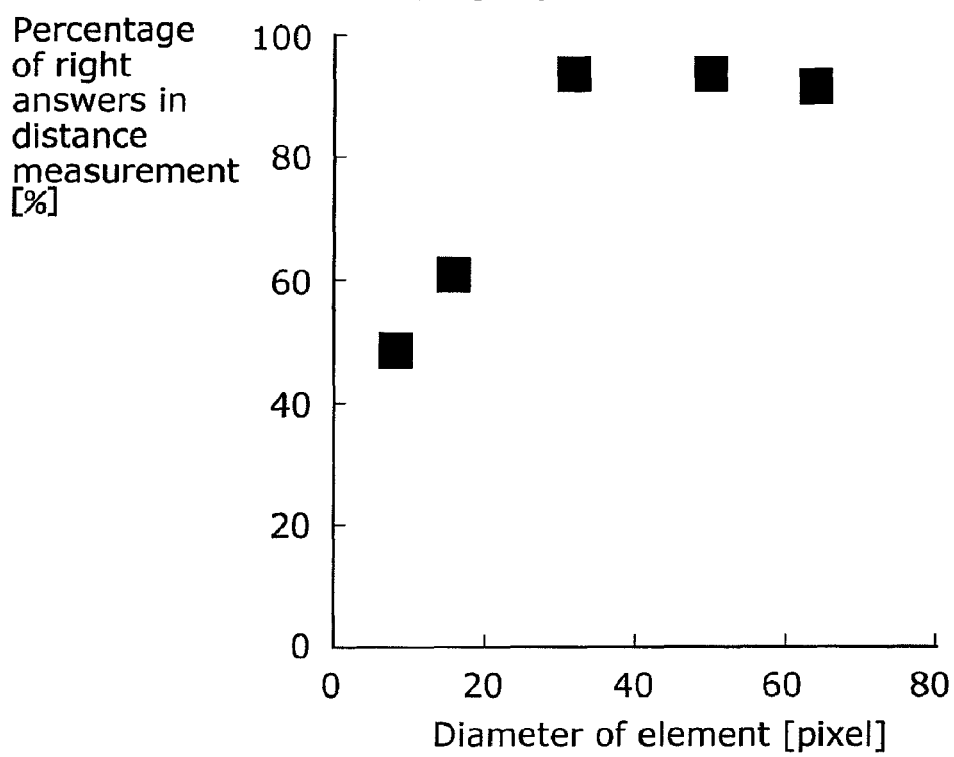
[FIG. 8]

FIG. 8 is a graph showing the experiment result obtained by measuring the variation in the distance measurement accuracy in the case of changing the diameter of each element in the dot pattern within the captured image. In FIG. 8, the horizontal axis shows the diameter of the element 23 in the reference chart 2 in the captured image. In addition, the vertical axis shows the percentage of correct answers in distance measurement within the image area in the case where the compound-eye distance measuring device 3 performs distance measurement according to the predetermined distance measurement accuracy verification chart as in FIG. 7. In this experiment, the percentage of the correct answers has been calculated assuming that a disparity detection error in the distance measurement calculation is within 0.3 pixel. As clear from the diagram, it is possible to perform highly-accurate distance measurement as long as the diameter of the element 23 corresponds to 25 pixels or more in the captured image. In other words, highly-accurate calibration can be performed as long as the diameter of the element 23 corresponds to 25 pixels or more in the captured image.

[Embodiment 2]

Next, Embodiment 2 of the present invention is described with reference to the drawings.

Figure 9:
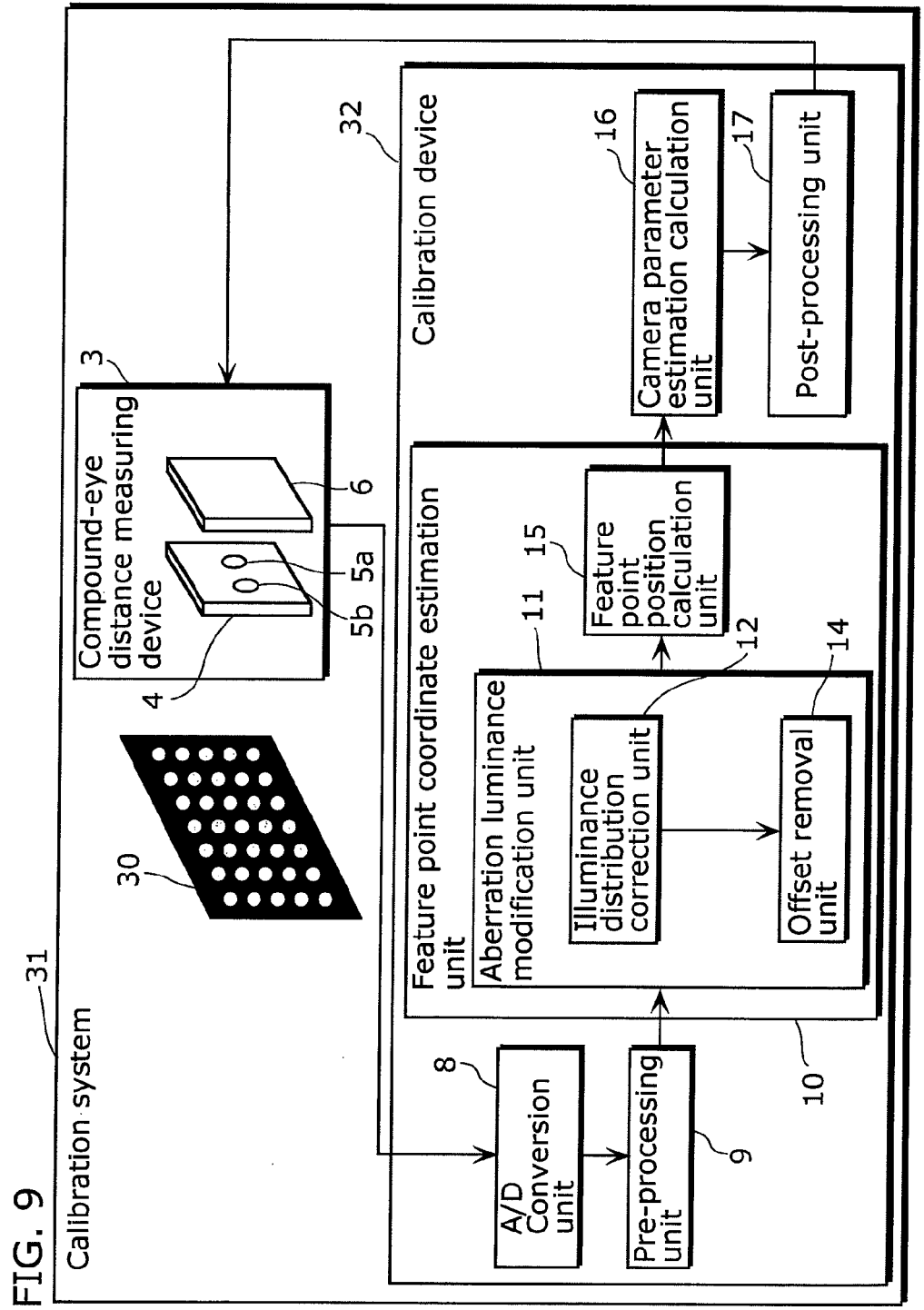
[FIG. 9]

FIG. 9 is a diagram showing a structure of a calibration system according to this Embodiment. The elements assigned with the same numerals as in FIG. 1 perform the same processing as in Embodiment 1, and thus descriptions are omitted.

Unlike the calibration system 1 of Embodiment 1, the calibration system 31 of this embodiment has a different color arrangement for the reference chart 30 and includes a calibration device 32 that does not include a luminance reverse unit 13, but the calibration system 31 is the same as the calibration system 1 of Embodiment 1 in the other elements and their functions.

The reference chart 30 is a chart of a dot pattern in which approximately circular white elements are drawn in a black background. In other words, in the reference chart 30, the colors of the respective elements have tones brighter than the tone of the background color. In addition, the reference chart 30 is a chart obtained by reversing the black and white in the reference chart 2 of Embodiment 1. Accordingly, the calibration device 32 of this embodiment does not require a luminance reverse unit 13 included in the calibration device 7 of Embodiment 1.

The calibration system 31 including the reference chart 30 shown in FIG. 9 performs calibration of the compound-eye distance measuring device 3, which enables more accurate calibration than the calibration performed in the calibration system 1 of Embodiment 1.

This results from that the total area of the background part is larger than the total area of the approximately circular elements in the reference chart 30 in FIG. 9 and the reference chart 2 in FIG. 1. In other words, the use of black for the background part as in the reference chart 30 of this embodiment and white or the like for the approximately circular elements reduces the area affected by variation in the distribution of illuminance of an illumination or the like more significantly than in the case of the reference chart 2 in Embodiment 1. Accordingly, the reference chart 30 can reduce disturbance mixed in an image significantly.

Figure 10:
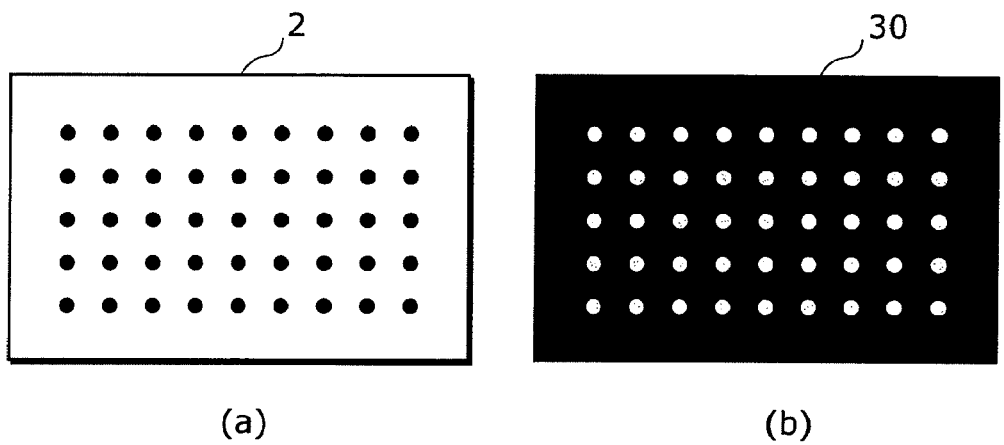
[FIG. 10]
Each of FIGS. 10(a) and 10(b) is a diagram showing a reference chart according to Embodiments 1 and 2.

FIG. 10(a) shows the reference chart 2 used in Embodiment 1. In addition, FIG. 10(b) shows the reference chart 30 used in this embodiment (Embodiment 2).

The reference chart 30 shown in FIG. 10(b) shows a black area larger than the black area in the reference chart 2 shown in FIG. 10(a). Black areas are less susceptible to variation in the distribution of luminance of an illumination or the like.

Figure 13:
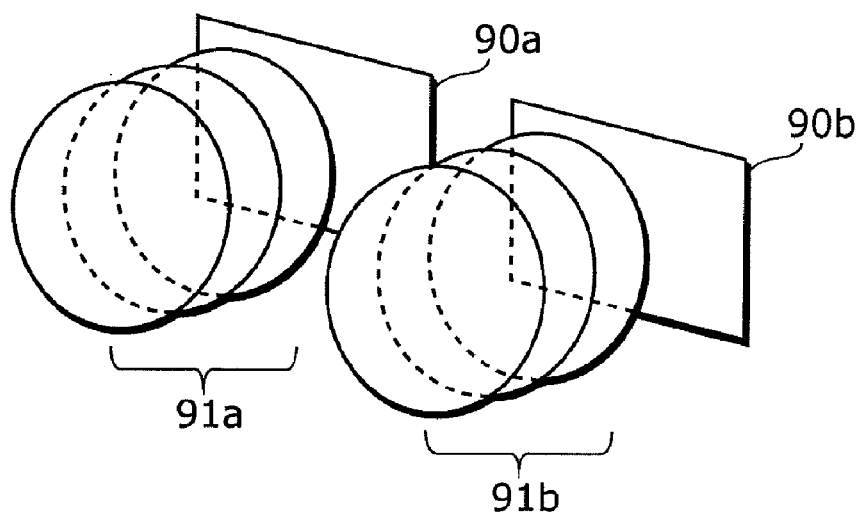
[FIG. 13]
Figure 14:
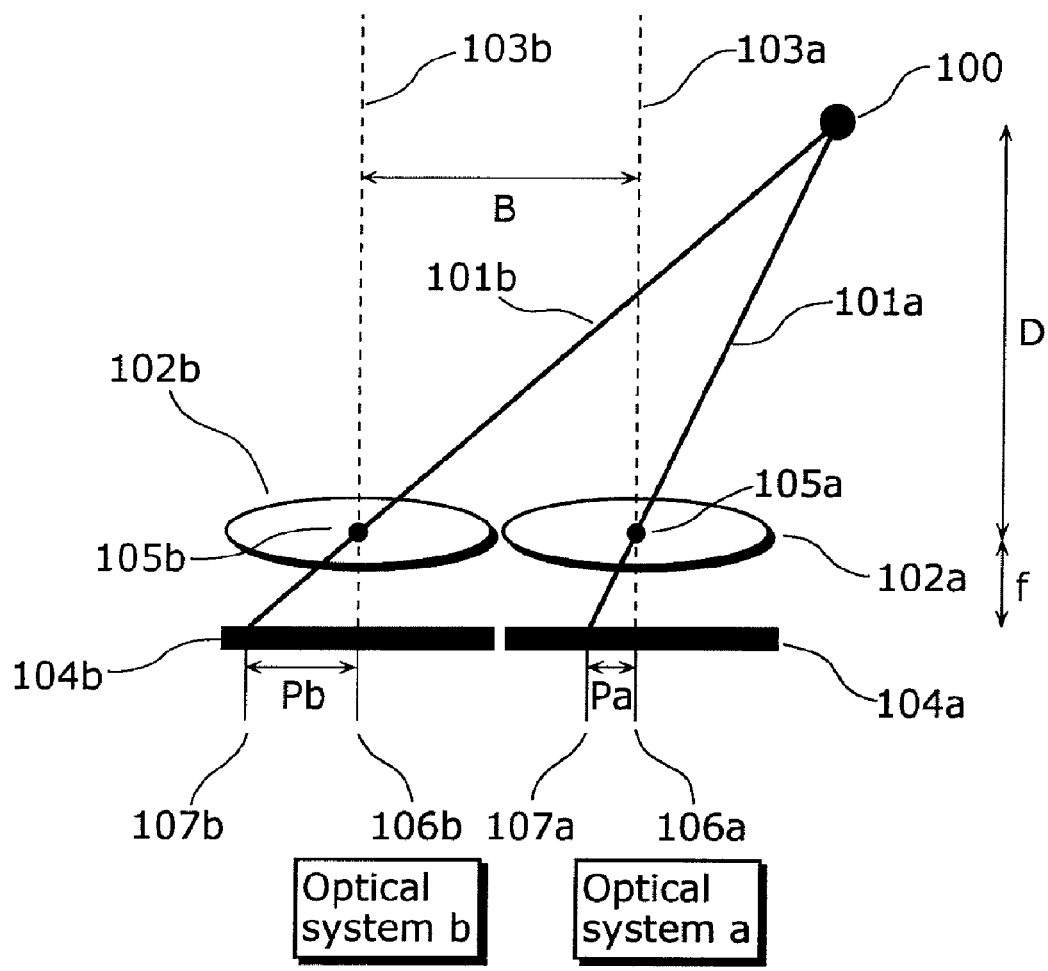
[FIG. 14]
Figure 15:
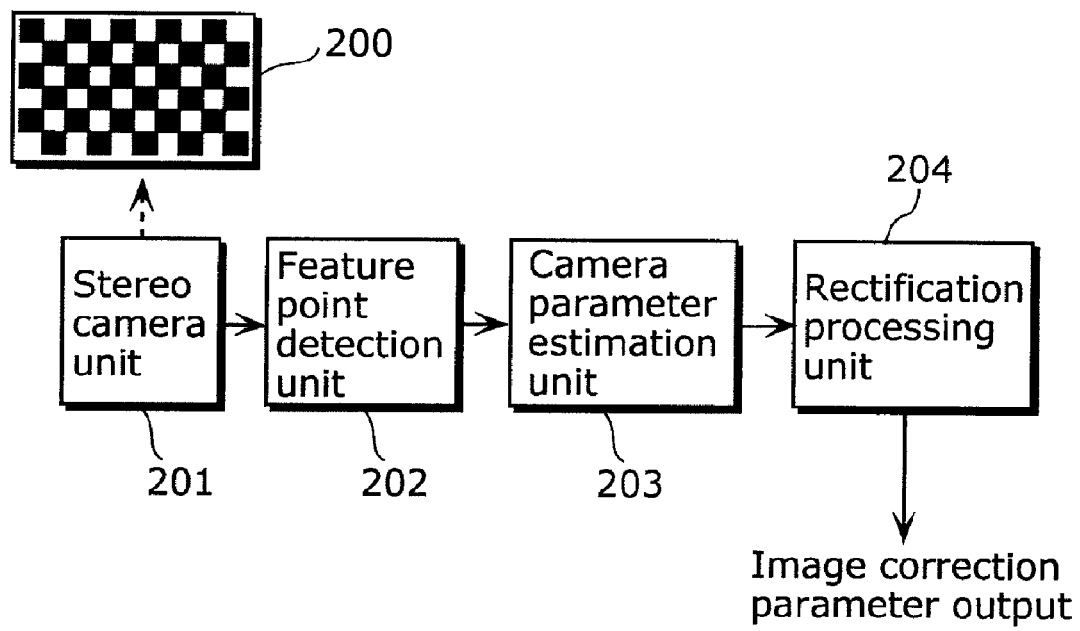
[FIG. 15]
Figure 16:
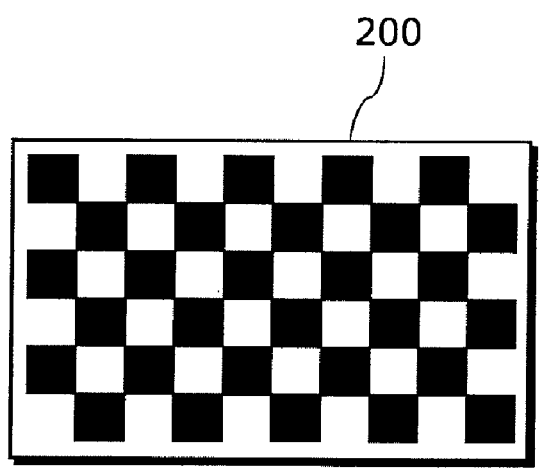
[FIG. 16]

Accordingly, compared to the calibration by a general stereo camera which produces little aberration (little disturbance with respect to the luminance variation in a chart image) as shown in FIG. 13, it is possible to effectively suppress deterioration in the feature point detection accuracy due to disturbance in the calibration by, in particular, the compound-eye distance measuring device 3 which produces significant distortion due to aberration (significant disturbance with respect to the luminance variation in a chart image).

In addition, the calibration system 31 of this embodiment can reduce disturbance mixed in an image more significantly than the calibration system 1 of Embodiment 1. This makes it easier to separate variation in the luminance values of the respective elements which constitute the dot pattern and the disturbance, thereby enabling more accurate calibration.

As described above, using a reference chart including little disturbance, the calibration system according to the present invention removes disturbance in an appropriate sequential order, corrects the aberration distribution appropriately, and calculates feature point coordinates according to gravity center calculation even when an image captured by a compound-eye distance measuring device includes significant lens aberration. Thereby, the calibration system enables highly-accurate calibration.

As in the case of Embodiment 1, it is desirable that the positional relationships between the diameter of each element in the dot pattern drawn in the reference chart 30, the compound-eye distance measuring device 3, and the reference chart 30 are determined such that the diameter of each element corresponds to 25 pixels or more in the image captured by the compound-eye distance measuring device 3. With this, the calibration system 31 can further reduce the influence of disturbance such as noise mixed in the image.

The calibration methods and the like according to the present invention have been described above based on Embodiments 1 and 2, but the present invention is not limited to these Embodiments. The scope of the present invention can be interpreted to include various modifications, of these Embodiments, which can be arrived at by those skilled in the art and embodiments conceived by arbitrarily combining structural elements of different Embodiments.

Figure 11:
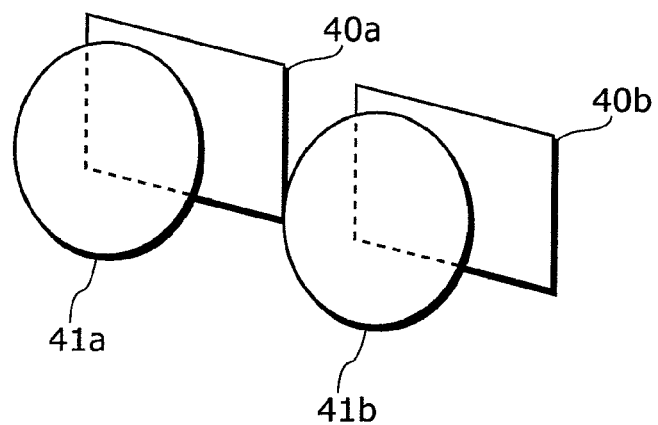
[FIG. 11]
Figure 12:
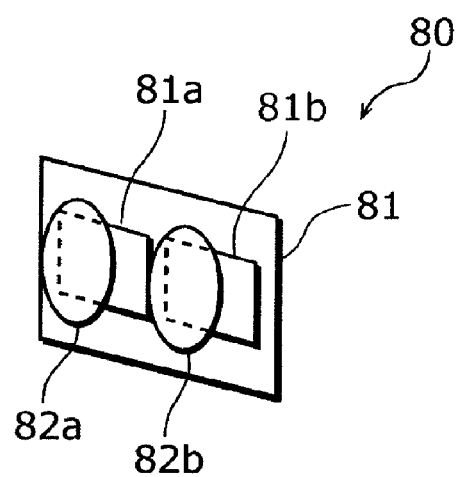
[FIG. 12]

As a matter of course, the same advantageous effects provided by these Embodiments can be obtained in calibration by a stereo distance measuring device including plural imaging devices 40a and 40b, and the respectively corresponding low-resolution lenses 41a and 41b as shown in FIG. 11.

In addition, the present invention is applicable to calibration by a stereo (multi-eye stereo) distance measuring device using three or more optical systems. In other words, the calibration method according to the present invention is applicable to general devices which measure disparity occurring between different optical systems with a high accuracy.

Furthermore, the calibration method according to the present invention is applicable to stereo cameras which detect disparity while shifting an optical system and calculate the distance to the object according to an image processing technique such as an optical flow.

In addition, although a dot pattern of approximately circular elements is drawn in the reference charts in the above-described embodiments, a geometric pattern including tetragons, hexagons or the like may be drawn instead. In addition, a reference chart to be used may be a display device such as a liquid-crystal display on which a geographical pattern is displayed.

In addition, although the sizes and arrangement positions of the reference charts are already known in these Embodiments, the size and arrangement position of a reference chart may be actually measured after an image of the reference chart is captured.

In addition, although each of the calibration devices in these Embodiments includes an A/D conversion unit, the calibration device does not necessarily include the A/D conversion unit. In the case where the calibration device does not include the A/D conversion unit, it receives a digital image signal from a compound-eye distance measuring device.

In addition, the present invention may be implemented as a program causing a computer to execute processing which is executed by a calibration device. Furthermore, the program can be distributed through recording media such as CD-ROMs and via communication networks such as the Internet.

The present invention relates to calibration by distance measuring devices capable of calculating either the distance to an object or the three-dimensional position or the shape of the object. The present invention is applicable to calibration by distance measuring devices used on vehicles, or for monitoring, medical use, games, generating CG (Computer Graphics) image, inputting solid images.

[Reference Signs List]

| | |
|---|---|
| 1 | Calibration system |
| 2 | Reference chart |
| 3 | Compound-eye distance measuring device |
| 4 | Lens array |
| 5a, 5b | Lens |
| 6 | Imaging device |
| 7 | Calibration device |
| 8 | A/D Conversion unit |
| 9 | Pre-processing unit |
| 10 | Feature point coordinate estimation unit |
| 11 | Aberration luminance modification unit |
| 12 | Illuminance distribution correction unit |
| 13 | Luminance reverse unit |
| 14 | Offset removal unit |
| 15 | Feature point position calculation unit |
| 16 | Camera parameter estimation calculation unit |
| 17 | Post-processing unit |
| 20 | Image signal |
| 21, 22 | Captured image |
| 23 | Element |
| 24 | Image signal |
| 25, 26 | Captured image |
| 30 | Reference chart |
| 31 | Calibration system |
| 32 | Calibration device |
| 40a, 40b | Imaging device |
| 41a, 41b | Lens |
| 80 | Compound-eye distance measuring device |
| 81 | Imaging device |
| 81a, 81b | Imaging area |
| 82a, 82b | lens |
| 90a, 90b | Imaging device |
| 91a, 91b | a group of lenses |
| 100 | Object |
| 101a, 101b | Light beam |
| 102a, 102b | lens |
| 103a, 103b | Optical axis |
| 104a, 104b | Imaging area |
| 105a, 105b | Optical center |
| 106a, 106b | Intersection |
| 107a, 107b | Image forming position |
| 200 | Reference chart |
| 201 | Stereo camera unit |
| 202 | Feature point detection unit |
| 203 | Camera parameter estimation unit |
| 204 | Rectification processing unit |
| 210a, 210b, 210c | Element |
| 211 | Intersection |
| 216 | Optical axis position |
| 217 | Imaging area |
| 221 | Lens |
| 222, 223 | Optical axis |

The invention claimed:

1. A calibration method for estimating a camera parameter representing a characteristic of imaging systems of a distance measuring device, each imaging system including a lens and an imaging area corresponding to the lens, and the calibration method comprising:

capturing, using the distance measuring device, an image of a reference chart which (i) represents a geometric pattern in which elements are arranged and (ii) is positioned to have a predetermined positional relationship with the distance measuring device;

modifying a luminance distribution affected by aberration of the lens in the captured image of the reference chart;

calculating, as a feature point position, a gravity center position of each element in the captured image whose luminance distribution is modified;

estimating the camera parameter using the feature point position calculated and an approximate actual gravity center position in the reference chart; and subtracting from a luminance value of each of the pixels, a removal value that is a value obtained by adding a predetermined offset value to a minimum luminance value within a corresponding one of calculation areas segmented for respective elements within the captured image, wherein the luminance distribution affected by the aberration of the lens is modified by subtracting the removal value from the luminance value of each pixel.

2. The calibration method according to claim 1, wherein the removal value is subtracted from the luminance value of each pixel such that the offset value is between 2.5% and 40% inclusive of a difference value between a maximum luminance value and the minimum luminance value within the calculation area.

3. The calibration method according to claim 1, further comprising:

correcting a luminance distribution affected by (i) variation in sensitivity within the imaging area and (ii) variation in illuminance of a light source which projects light on the reference chart, and the removal value is subtracted from the luminance value of the captured image whose luminance is corrected.

4. The calibration method according to claim 3, wherein, the luminance distribution affected by (i) the variation in sensitivity within the imaging area and (ii) the variation in illuminance of the light source which projects light on the reference chart is corrected using a luminance distribution in a captured image of a illuminance distribution correction chart with a uniform color, the captured image being captured under approximately the same imaging condition for the reference chart.

5. The calibration method according to claim 1, wherein the geometric pattern of the reference chart is a dot pattern in which approximately circular elements are arranged, and the captured image of the reference chart is captured by the distance measuring device such that a diameter of each of the approximately circular elements corresponds to 25 pixels or more in the captured image.

6. A calibration device which estimates a camera parameter representing a characteristic of imaging systems of a distance measuring device using a captured image of a reference chart representing a geometric pattern, each imaging system including a lens and an imaging area corresponding to the lens, and the calibration device comprising:

an aberration luminance modification unit configured to modify a luminance distribution affected by aberration of the lens in the captured image;

a feature point position calculation unit configured to calculate, as a feature point position, a gravity center position of each of elements in the captured image whose luminance distribution is modified by the aberration luminance modification unit;

a camera parameter estimation calculation unit configured to estimate the camera parameter using the feature point position calculated by the feature point position calculation unit and an approximate actual gravity center position in the reference chart; and an offset removal unit configured to subtract, from a luminance value of each of the pixels, a removal value that is a value obtained by adding a predetermined offset value to a minimum luminance value within a corresponding one of calculation areas segmented for respective elements within the captured image, wherein the luminance distribution affected by he aberration of the lens is modified by subtracting the removal value from the luminance value of each pixel.

7. A calibration system, comprising:

a reference chart representing a geometric pattern;

a distance measuring device including imaging systems each including a lens and an imaging area corresponding to the lens; and a calibration device which estimates a camera parameter representing a characteristic of each imaging system, using a captured image of the reference chart captured by the distance measuring device, wherein the calibration device includes:

an aberration luminance modification unit configured to modify a luminance distribution affected by an aberration of the lens;

a feature point position calculation unit configured to calculate, as a feature point position, a gravity center position of each of elements in the captured image whose luminance distribution is modified by the aberration luminance modification unit;

a camera parameter estimation calculation unit which estimates the camera parameter using the feature point position calculated by the feature point position calculation unit and an approximate actual gravity center position in the reference chart; and an offset removal unit configured to subtract, from a luminance value of each of the pixels, a removal value that is a value obtained by adding a predetermined offset value to a minimum luminance value within a corresponding one of calculation areas segmented for respective elements within the captured image, wherein the luminance distribution affected by he aberration of the lens is modified by subtracting the removal value from the luminance value of each pixel.

8. The calibration system according to claim 7, wherein the reference chart represents a dot pattern in which approximately circular elements are arranged, and a color of each approximately circular element has a tone brighter than a tone of a background color.

9. A non-transitory computer-readable recording medium storing a program causing a distance measuring device to estimate a camera parameter representing a characteristic of image systems, using a captured image of a reference chart representing a geometric pattern, each imaging system including a lens and an imaging area corresponding to the lens, and the program causing a computer to perform steps comprising:

capturing, using the distance measuring device, an image of a reference chart which (i) represents a geometric pattern in which elements are arranged and (ii) is positioned to have a predetermined positional relationship with the distance measuring device; modifying a luminance distribution affected by aberration of the lens in the captured image of the reference chart;

calculating, as a feature point position, a gravity center position of each element in the captured image whose luminance distribution is modified;

estimating the camera parameter using the feature point position calculated and an approximate actual gravity center position in the reference chart; and subtracting, from a luminance value of each of the pixels, a removal value that is a value obtained by adding a predetermined offset value to a minimum luminance value within a corresponding one of calculation areas segmented for respective elements within the captured image, wherein the luminance distribution affected by the aberration of the lens is modified by subtracting the removal value from the luminance value of each pixel.

* * * * *